Aug. 2, 1960   H. A. QUIST   2,947,170
PRESSURE OPERATED LIQUID LEVEL MEASURING DEVICE
Filed May 20, 1955   6 Sheets-Sheet 1

INVENTOR.
HAROLD A. QUIST
BY
Robert O. Spindle
ATTORNEY

Aug. 2, 1960          H. A. QUIST          2,947,170
PRESSURE OPERATED LIQUID LEVEL MEASURING DEVICE
Filed May 20, 1955          6 Sheets-Sheet 2
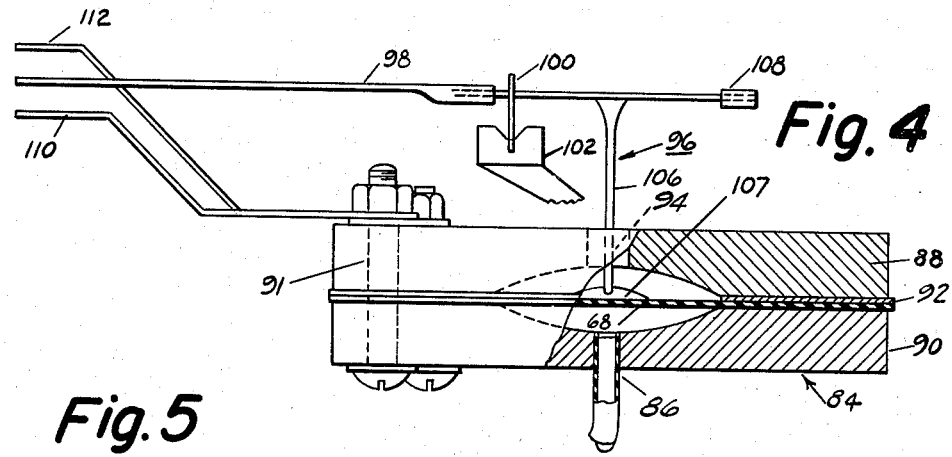
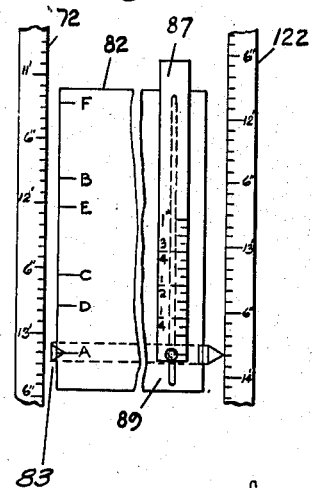
INVENTOR.
HAROLD A. QUIST

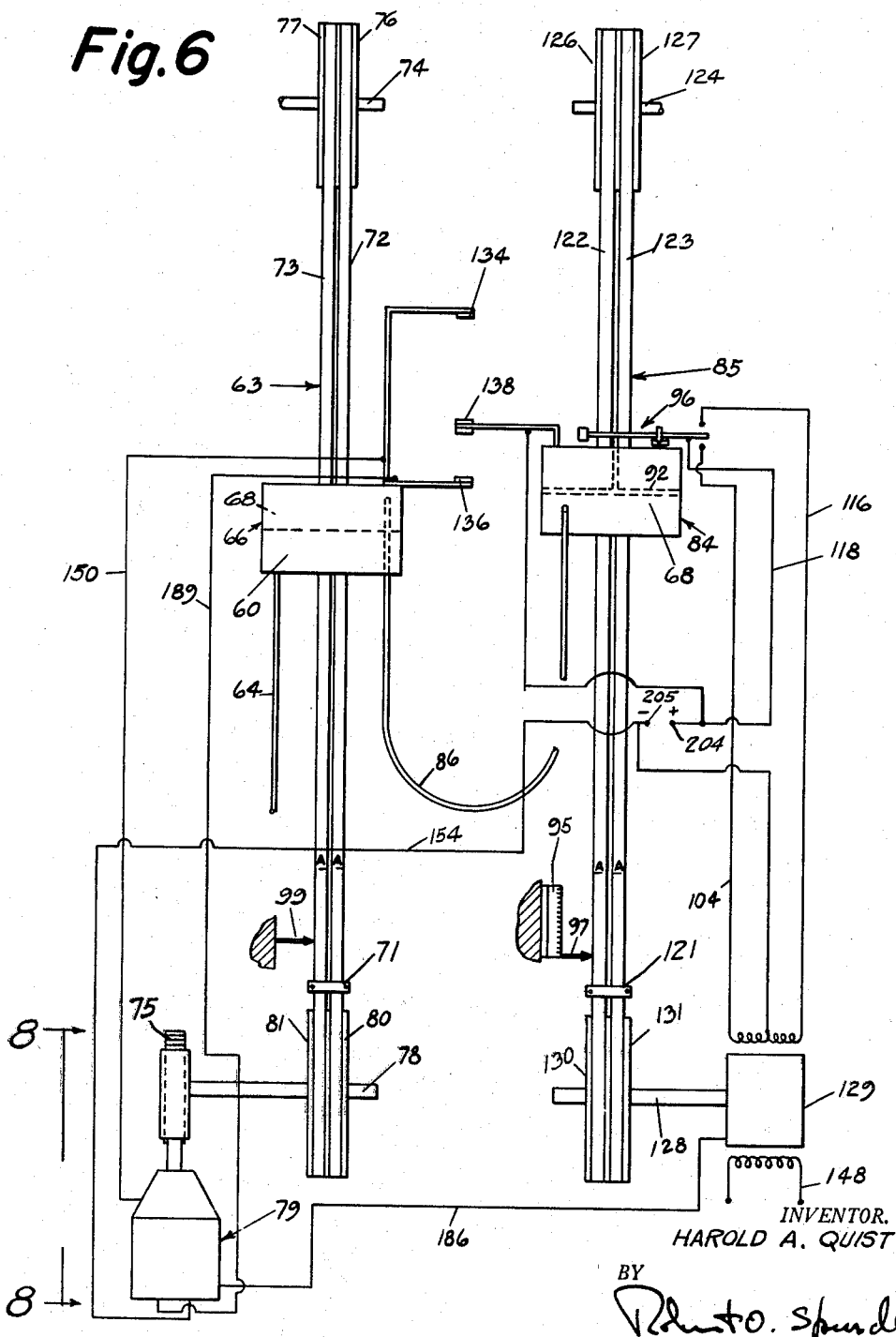

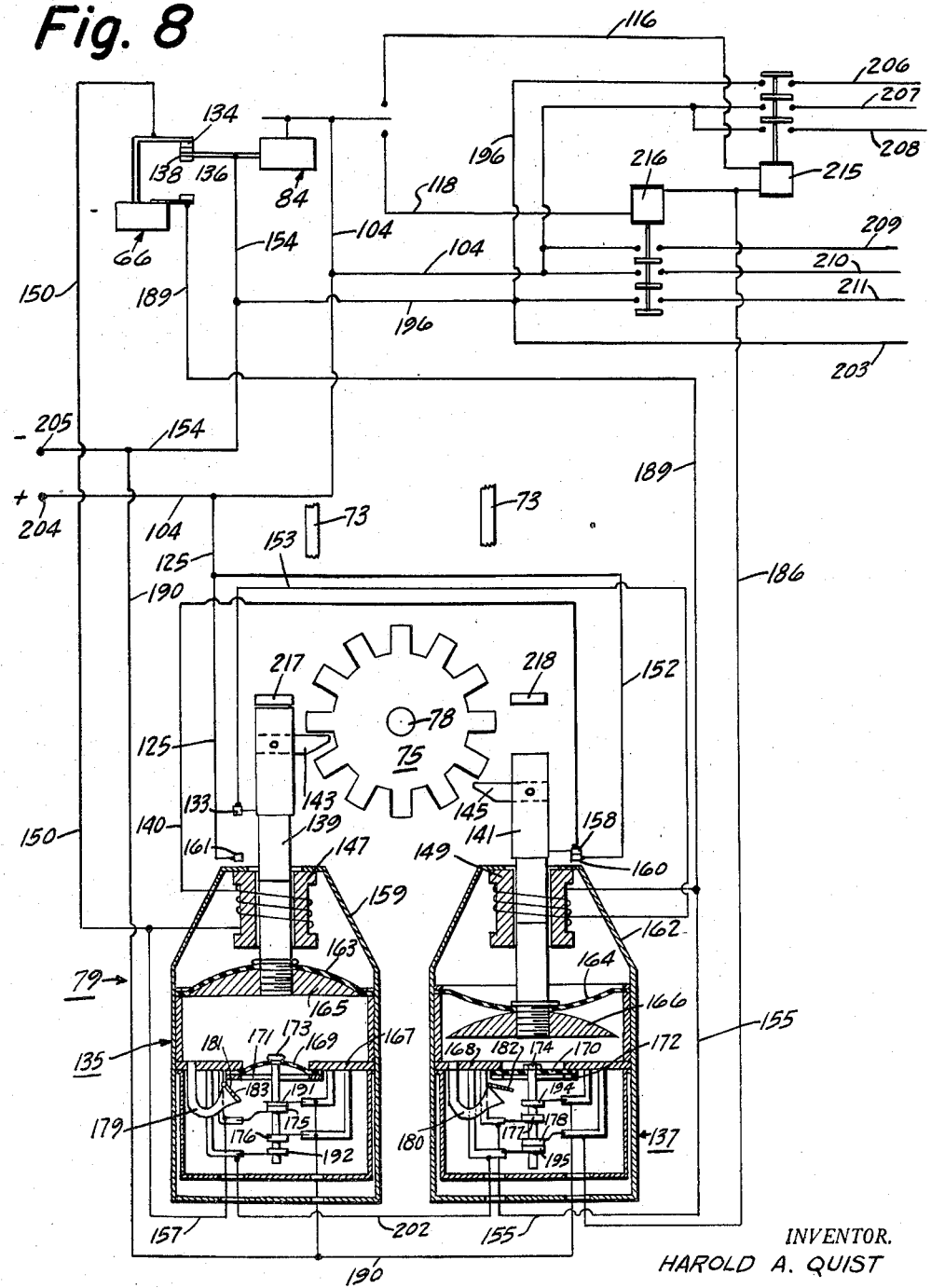

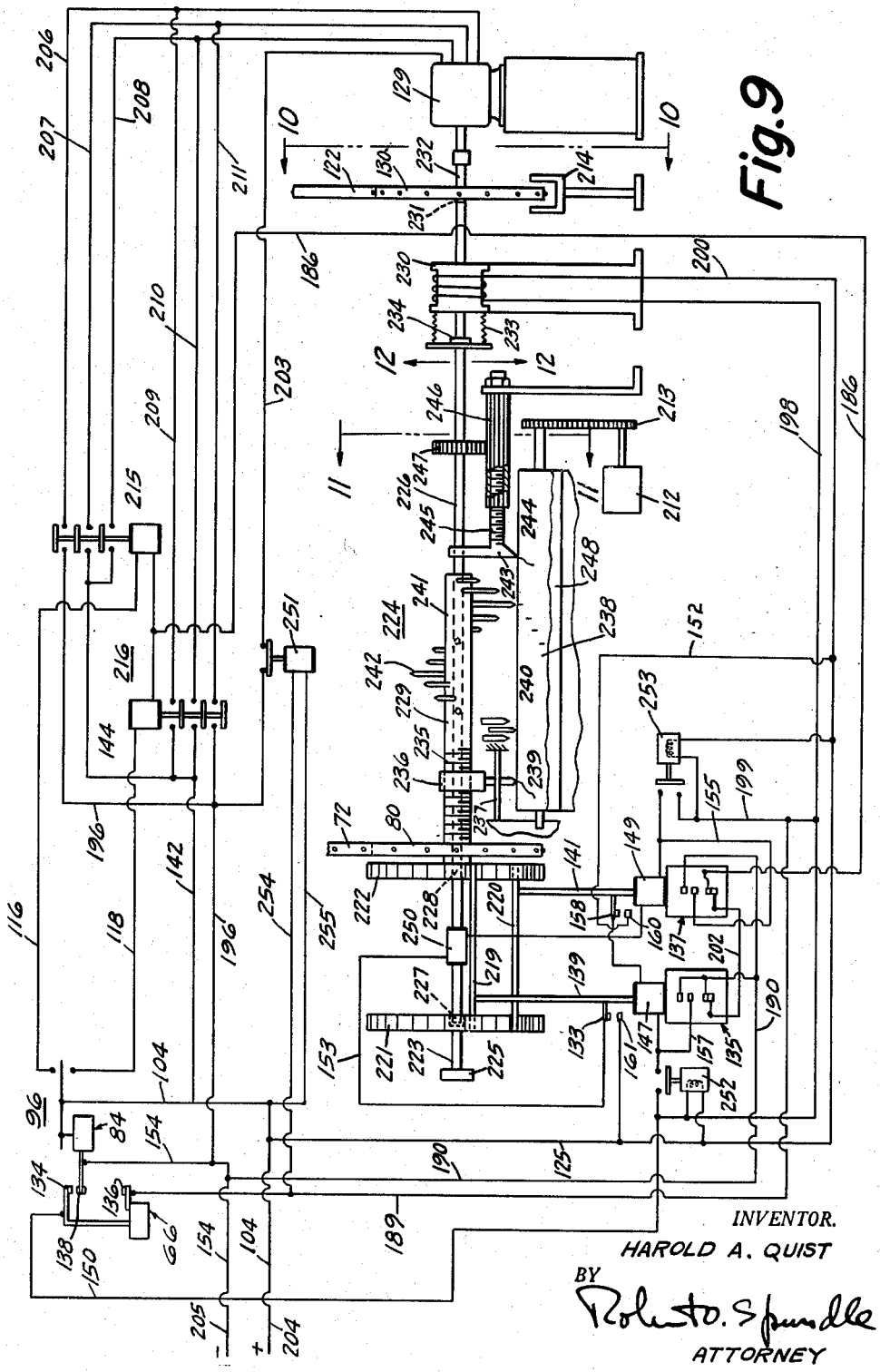

Aug. 2, 1960 H. A. QUIST 2,947,170
PRESSURE OPERATED LIQUID LEVEL MEASURING DEVICE
Filed May 20, 1955 6 Sheets-Sheet 6

INVENTOR.
HAROLD A. QUIST
BY
ATTORNEY

United States Patent Office 2,947,170
Patented Aug. 2, 1960

2,947,170

PRESSURE OPERATED LIQUID LEVEL MEASURING DEVICE

Harold A. Quist, Swarthmore, Pa., assignor to Sun Oil Company, Philadelphia, Pa., a corporation of New Jersey Filed May 20, 1955, Ser. No. 509,880

20 Claims. (Cl. 73—311)

The present invention relates to liquid level measuring devices and particularly to pressure operated devices capable of separately indicating and recording relatively minute changes in the level of liquids in a multiplicity of storage vessels.

In my Patent 2,760,373, issued August 28, 1956, the problem of obtaining accurate measurements by known systems of the level of stored liquids which are subject to change was divided into two parts for discussion, the liquid-level sensing means of such systems, and the indicating and/or recording means. That application discloses and claims illustrative apparatus for the improvement of both the liquid level sensing and indicating means. It is the principal object of this invention to provide an improved indicating means rapidly responsive to liquid level changes and having greater accuracy for use with sensing means in general.

A further object is to provide a liquid level indicating means, responsive to liquid pressure changes as initiated by liquid level sensing means.

Yet another object is to provide a liquid level indicating and recording device adapted to operate in a location removed from the storage area and responsive, separately, for measuring liquid levels in each of a plurality of such storage vessels in one pressure responsive mechanism.

Still another object of this invention is to provide an indicating-recording device which will separately measure the liquid contents of a number of storage vessels, or which can be used for continuous operation coupled to any selected vessel of the group it attends.

A basic device, modified to perform progressively automatic operations, is shown and described in the accompanying specification. In general, the liquid elevation sensing mechanism includes two vertically adjustable pressure receiving cells. One is connected directly to a source of pressure which is responsive to stored liquid elevation, float supported in each of the storage tanks. The other cell is connected to the first cell by a flexible tube and receives a portion of the original pressure.

These cells are mounted adjacent each other on vertically movable tapes. By moving the cells upwardly or downwardly until they balance the received pressure, they elevationally indicate the height of the connected sensing elements floating on the body of the stored liquid. Indicia cooperating with the scales on the supporting tapes indicate feet and inches of elevation for the first cell and fractions of an inch for the second cell.

Advantage is taken of the difference between the specific gravities of known liquids so arranged as to be subject to a minimum of affecting temperature changes, yet capable of transmitting pressure changes from the source to the indictor. The initiating liquid is placed to respond directly to the liquid level changes in the storage vessels. Connection is then made to a separate insulated pressuring chamber placed adjacent the storage vessel. These separate pressuring chambers are manifolded into a common pressuring chamber proximate the indicating mechanism, and each is separately controlled to pass pressure thereto by valve means. Connected to this common pressuring vessel, the unique indicator of this application is either manually or automatically actuated to show the level of the stored liquid in any selected vessel or to record level changes in any one vessel.

The storage vessels are separately connected by a liquid filled, pressure transmitting system, in which the pressure transmitting liquid is stationary, to a single pressuring chamber which is then connected to the pressure indicating device. As the separate sensing elements connected to the separate storage vessels are always filled with liquid, the operation of the control valves will admit selected tank pressure to the common chamber without liquid movement and bar all other vessel pressures.

Several variations of this basic structure are shown and described. The pressure balancing cells are made to operate mechanically, and to record the stored liquid variations, by described and illustrated elements. Thus the above objects are attained by a simplified mechanism of great accuracy.

With the above and other objects in view, the invention consists in the arrangement and combination of the parts hereinafter described, claimed and shown in preferred form in the drawing, in which:

Figure 4 is a sectional elevational view of one element of the device shown in Figure 3.

Figure 5 is an elevational view of a portion of the assembly shown in Figure 3.

Figure 6 is a sectional elevational view of a modification of the device shown in Figure 3.

Figure 7 is an enlarged view of a modified form of specific elements of the device shown in Figure 6.

Figure 8 is an elevational detail of the operating elements shown in Figure 6, partly in diagrammatic form.

Figure 9 is a detail of the recording mechanism.

Figure 10 is a sectional view of Figure 9 taken on line 10—10.

Figure 11 is a further sectional view of Figure 9 taken on line 11—11.

Figure 12 is a sectional detail of an element in Figure 9 taken on line 12—12.

The previously noted Patent 2,760,373 is concerned with the problems of transmitting, by means of pressure, the sensed elevations of stored liquid surfaces and also those problems of indicating this transmitted data after it is received at the measuring point. A tall tube vertically positioned at the measuring and indicating or reading point in which the true level of the liquid appears is suggested and abandoned in favor of the improved, multilegged manometer shown there. Also, the problem of temperatures as they would affect such a direct reading device is mentioned and disposed of, there, with unique apparatus.

In this case the liquid level sensing elements of the above patent will be reproduced diagrammatically as one means of obtaining the initial information from the selected storage vessel. For purposes of exact measurement of the stored liquid level, the temperature measuring elements as shown there in combination with the sensing device are included by reference. These elements are not intended to exclude other level sensing and temperature measuring devices which can be used with the disclosed indicating-recording mechanism. Consequently such elements will be described and claimed as broadly as possible where necessary to cover the combined device, and will be omitted from the combination when the indicator-recorder alone is claimed.

The general assembly

Figure 1:
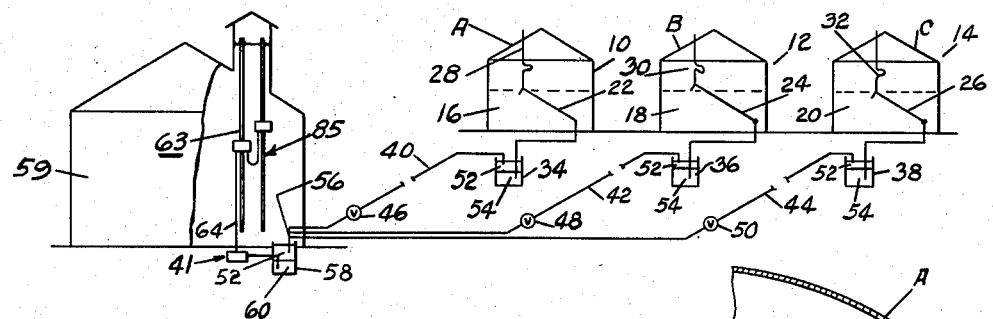
Figure 1 is a diagrammatic sketch of one form of operating assembly of the disclosed device.
Figure 2:
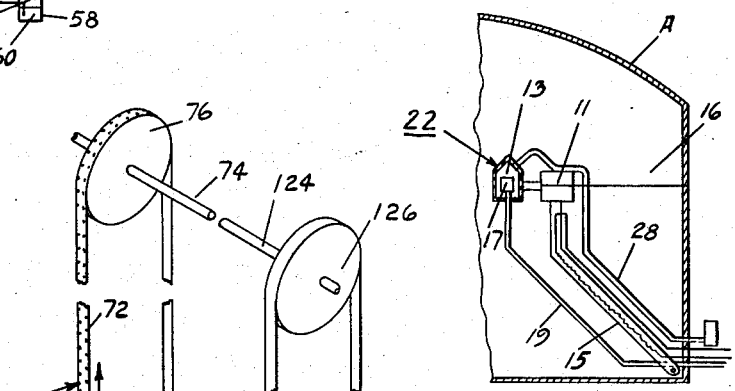
Figure 2 is a diagrammatic elevational view of one form of liquid level sensing device indicated in Figure 1.

The pressure transmitting structure of this assembly is diagrammatically illustrated in Figure 1 of the drawing and is detailed, with respect to the separate liquid level sensing devices, in Figure 2. The application of reference specifically discloses this element of the assembly reproduced here for clarity. A plurality of storage vessels shown here diagrammatically as numbers 10, 12 and 14 include volumes of stored liquids 16, 18 and 20 at varying levels. Float supported liquid level and average temperature sensing means such as disclosed and claimed in Patent 2,760,373 are symbolized and numbered 22, 24 and 26. Figure 2 details the mechanism enclosed in storage vessel 10 or, as later indicated, A, indicative of like devices in other receptacles, as including a support float 11 and operating float 13 hinge-connected to the bottom of the vessel by the support 15. A sensing liquid support chamber 17 in operating float 13 is connected to the pressure transmission elements later to be described by conduit 19, and atmospheric pressure is let into float 13 by conduit 28. Other sensing means can be used as already indicated, these being shown to complete a preferred and operating combination. Connections 28, 30 and 32 are made to the atmosphere to balance a like pressure which is effective in the indicating device to be disclosed later.

Separate pressuring chambers 34, 36 and 38 located proximate their separate and respective storage tanks 10, 12 and 14 are positioned to receive the pressure transmitting liquid column 54 from the variable float means 22, 24 and 26. These chambers are buried or otherwise insulated to reduce the temperature variation effect to a minimum or at least to an ineffectual value. This is a necessary precaution especially where mercury is the liquid used in the liquid level sensing means.

In the valved conduits 40, 42 and 44 in which the valves 46, 48 and 50, preferably electrically operated, for cooperation with the charting mechanism of the automatic device described later, are controlling elements, another liquid, non-miscible with the first mentioned pressuring liquid, is used. A liquid 52 such as glycol and water mixed is suggested as it will not freeze, expands or contracts very little in response to temperature changes, is non-corrosive and cannot be compressed to any measurable degree.

The separate conduits 40, 42 and 44 are joined below the separate control valves into a common manifold 56 which leads the liquid 52 into the common pressure chamber 58, which is also insulated from temperature effects. A liquid 60, denser than that used to transmit pressure in conduits 40, 42 and 44 noted here by the numeral 52 and non-miscible therewith, receives the pressure in the chamber 58. The indicator, manually or automatically operated, and the recording instrument incorporated later in this disclosure are housed in a pump house or other building 59, and are pressure connected to this described pressure transmitting system forming an effective, pressure-operated liquid level measuring combination.

Sudden changes in pressures transmitted to the indicator operating the valves to connect the separate tanks requires a support chamber 41 between the chamber 58 and the indicator mechanism. Such a safety device is indicated in Figure 1 and shown in larger scale in Figure 3. Increases in pressure transmitted to the indicator mechanism will not affect the device to any degree. Sudden decreases, however, greater than the support afforded by atmospheric pressure in the preferred embodiment would create a vacuum in the device which must be prevented. A column of dense liquid 60 is supported in conduit 64 above a diaphragm 43 supported by grid 45 in the chamber 41. As conduit 64 is flexible and the system for transmitting pressure changes is thus assured of remaining full of liquid, the use of the device for serving a multiplicity of tanks under all conditions is made possible.

For ease of description and understanding, the disclosure is divided into three broad divisions directed to the manually operated form of indicator, the automatically operated indicating assembly, and the recording assembly. Each of these divisions includes a discussion of operation of the elements which shows their relationship to each other and interdependence of all previously named elements. The principles of operation as outlind broadly above apply equally to these subdivisions and the elements of the most basic combination form a part of the next more complicated system.

The manually operated liquid level indicator

Figure 3:
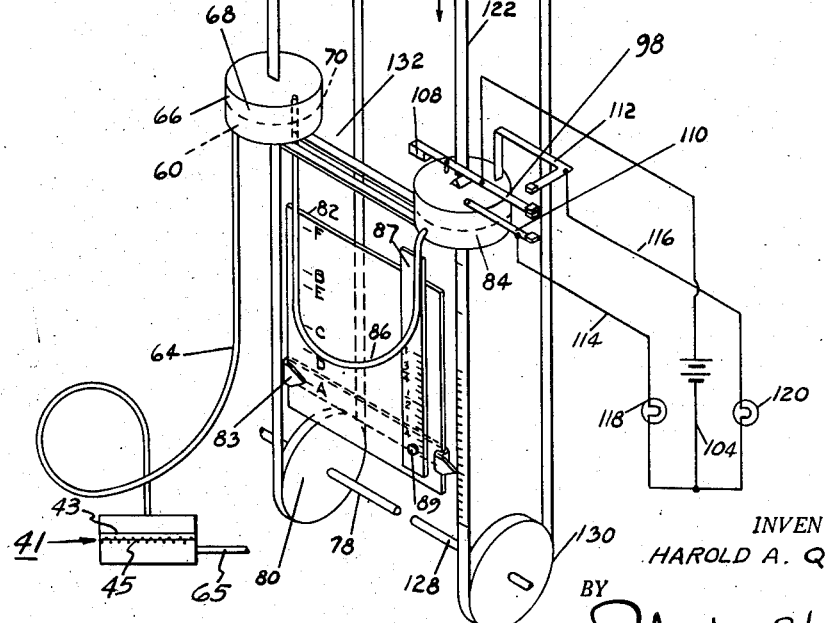
Figure 3 is an elevational view in perspective of one form of liquid level indicating mechanism.

For ease of description, this assembly is divided into two sub-assemblies 63 and 85 as indicated in Figure 3.

The first sub-assembly 63 includes a pressure transmitting conduit 64, all or part of which is flexible, operably connecting the first of two pressure cells forming the operating elements of the liquid level indicator. This first cell 66 is a hollow, sealed vessel of any desired cross-section and of a depth sufficient to receive and hold an appreciable quantity of liquid. The denser of two liquids occupies the lower portion of this cell 66 and is, here, the same as liquid 60 previously referred to as filling the lower portion of the common pressure chamber 58. A second liquid 68 of lesser specific gravity and fulfilling the requirements of non-miscibility, etc., listed above, fills the upper portion. The dotted line 70 is merely the liquid face between these liquids and does not represent a diaphragm or other separating structure.

Supporting the pressure cell 66 in fixed relation, a vertically adjustable graduated tape 72 is positioned to indicate the measurable effect of the pressure from the common pressure chamber 58. An upper shaft 74 with pulley 76 supports the tape 72, shown in an endless form for simplicity, while a like structure of shaft 78 and pulley 80 forms the lower positioning member. A fixed scale 82 is a point of reference against which the graduated tape 72 is read for one dimension of the liquid level elevation. The scale 82 on which the index 83 is movably mounted permits adjustment to a different datum as required where a number of different tanks are measured by one instrument. The movable fractional scale 87 connected to the movable index 83 at point 89 is fitted to slide vertically on the scale 82 as the index is adjusted. These elements are shown in operating relation in Figure 5.

Adjacent this first pressure cell elevation indicating means noted as sub-assembly 63, which may be called the "approximate measuring means" as will be better understood after reading the description of operation, a second pressure cell 84 is mounted in a second associated measuring sub-assembly generally indicated by the number 85. This cell is different from the first described cell 66 and is shown in detail in Figure 4. The sub-assembly 85 may be defined as the "exact measuring means" of the indicating instrument and is adapted to bring precision to the approximate measurement established by sub-assembly 63. This action is initiated by a transfer of the unbalanced pressure from cell 66 to cell 84 through liquid 68 which fills the upper portion of the first cell. Flexible conduit 86 projects into the upper portion of cell 66 where liquid 68 is contained and is connected to the lower section of cell 84.

Figure 4 illustrates one form which cell 84 may take for successful operation of the device. A pair of opposed body portions 88 and 90, made of glass, plastic or other corrosion resistant material of sufficient strength and light in weight, are drilled to receive fasteners such as bolts 91 spaced to securely hold the portions together. Both portions 88 and 90 are dished in the center to permit movement of the diaphragm 92 which is supported between the body portions in sealing engagement. The conduit 86 enters the lower body portion to direct the pressured liquid beneath the diaphragm 92 in the lower dished area. An aperture 94 through the upper body portion 88 leads into the upper dished area to admit atmospheric pressure to counteract that pressure already admitted by conductors 28, 30 and 32 to the liquid level sensing elements in the storage vessels, and also to admit a switch mechanism to bear on the diaphragm.

The switch mechanism 96 as mounted on the pressure cell 84 has elements common to both the manual and automatic indicators and forms a part of the recording combination later to be described. As illustrated, the switch mechanism 96 is designed for quick, unobstructed response to all movements of the diaphragm 92. It will be understood that any form of switch responsive to diaphragm movement can be used. The mechanism shown here is included to complete an operating device and fulfills the above requirements in addition to being light in weight, balanced and of simple construction.

A contact arm 98 fastened to a knife edge 100 is balanced on a pair of notched bearing brackets 102. The brackets 102 in turn fastened to the cell 84 form the contact through the contact arm 98 of the common or ground wire 104 (Fig. 3) of a three wire circuit. Behind the knife edge bearing support, the operating arm 106 projects downwardly from its connection with the contact arm 98 into operating engagement with the diaphragm 92 on receiving plate 107. To insure constant operating engagement between the two, a small weight 108 is used to balance the arm 98 in the direction of engagement. The assembly so described, except for the operating arm 106, is required to be made of conducting material to permit the passage of electricity therethrough when a circuit is completed.

Positioned to engage the contacting end of contact arm 98, separate contacts 110 and 112 are mounted on the cell 84 and connected in circuit by conductors attached to the bolts engaging the contacts. Again referring to Figure 3, the conductors 114 and 116 are indicated as these circuit completing wires. Lights 118 and 120 are connected in circuit as indicators of the upward or downward movement of the diaphragm 92 in cell 84, and the intermediate position when both lights are extinguished.

Bridging between the under sides of the first and second pressure cells 66 and 84 respectively in Figure 3, a bracket 132 extends. This bracket should be light in weight but sufficiently strong to require both the cells to move together. It should be fastened to the under side of cell 66 and be free to engage and disengage cell 84. By means of this bracket both cells are manually raised together by lifting cell 66 on tape 72; or both are lowered together by lowering cell 84 on tape 122. As will be understood later in reading the description of operation, cell 84 always moves upwardly from the rough measurement established by cell 66 to establish the precise measurement. The bracket, used as described, prevents the cells from being disengaged if too widely separated by breaking flexible conduit 86. Without the bracket an excessively long flexible connection 86 would be required. It will be evident that such arrangement can be used to eliminate the diaphragm 92 where the liquid 68 indicates the desired elevation in cell 84 without any electrical indicator as described.

Cell 84 is attached to a graduated tape 122 shown here as an endless tape similar to tape 72 previously described. Tape 122 carries the same graduations as tape 72, the reason for which will be understood later in the specification. Figure 5 illustrates the tape and scale marking used. Supporting means for tape 122 conforms with the structure indicated to operably hold tape 72. As described previously, an upper shaft 124 and pulley or wheel 126 cooperate with a lower shaft 128 and a pulley 130. These tape support assemblies of shafts and pulleys are shown as separated to indicate independent operation.

The adjustable index 83 is movably mounted on a fixed vertical scale 82 positioning the fractional scale 87 for cooperative measurement with tape 122 of sub-assembly 85. By transferring the datum of each storage vessel to the scale 82, zero for each vessel is established to cooperate with the measuring tapes. The vessels are indicated by the letters A to F on scale 82 (Fig. 5) indicating positions for index 83, as required by the elevation of the storage vessel being measured. Although one fixed scale and movable index is shown, it will be evident that two separate scales may be placed to serve both tapes 72 and 122 separately and will satisfy the requirement. The physical separation of these scales will not serve any additional purpose, however, and the operation will be fully understood by retention of a single scale as shown.

*Manual indicator operation*

The modifications in form of the above-disclosed manually operated mechanism as shown in the later figures of the drawing are equally dependent on utilizing the basic elements already described, as previously noted. The adaptation of this manual form of indicator into an automatic indicator and later into a recording device add to the number of elements but do not change the operating principles. Consequently the operation of the device as illustrated in Figures 1 through 5 of the drawing will be discussed at this point rather than after the description of the modified forms. It is believed this procedure will make clearer the novelty and advantages of the described combination, and afford greater brevity of later descriptions by permitting more easily understood reference to this basic device.

To those versed in the art, it will be evident after reading the above description of the details of this initial form of the device that the vertical measuring tube suggested as one solution to this problem in Patent 2,760,373, with its inherent difficulties, forms the background of this application. In the file of reference, the indicating mechanism was reduced in size and designed to permit easy reading with proper control, as one solution to the problem. This present disclosure retains the suggested tall tube principle, but makes it flexible and variable in height utilizing the pressure created in it at the storage vessel in direct response to the liquid level elevation there, as the operating force. By using electrically responsive signals and interlocking height adjusting devices the indication and/or record of the liquid height is made possible, as fully described later.

The manually controlled indicator of Figure 3 is preferably mounted in a building proximate the storage vessels to be measured previously described as a pump house or other building 59. Necessary clearance for the vertically operable tapes 72 and 122 of the indicator is gained by lifting a portion of the roof of the building as shown, should it be necessary. This would be necessary if the relative elevations of the subtended tanks and the building were so different that the datum for the several tanks varied by several feet. In this instance the length of the tapes would be increased accordingly in order to permit measurement of the greatest liquid level in the highest tank. It will be evident that initial elevation correction externally of the measuring apparatus can be made outside the storage tank by placing the pressuring chambers 34, 36 and 38 at relative elevations to deliver an initial or datum pressure through the manifold 56 to the pump house giving an identical datum level for all tanks. The more complex problem of different elevation is retained here, however, to emphasize the inventive features of the device.

By well known surveying methods the data of the several tanks, symbolized as tanks 10, 12 and 14 of Figure 1, are transferred to the vertical scale 82 of the measuring sub-assemblies 63 and 85. This datum may be the actual bottom of the tanks, the water level usually maintained there, or any other selected base. Further it may be indicated by feet and inches, tank number or letter, or any other chosen way on the vertical scales for rapid adjustment. Once the index 83 is set for the selected tank, it will evidently establish the zero or datum from which all elevations will be read for the selected tank. It then remains to open one of the control valves 46, 48 or 50 to admit the pressure of the selected tank to the common pressure chamber 58 while shutting off the valves of the unselected tanks. An interlocking mechanism for these electrically controlled valves to insure single tank pressure transfer will suggest itself.

It has been indicated above that the portion of the device for sensing liquid levels and measuring average temperatures of stored liquids (Figure 2) fully disclosed in the application of reference affords a preferred mechanism for that same use in the storage receptacles. Further, the temperature effects on the pressure transmitting fluids which would influence the transmitted pressure from the separate vessels are reduced to negligible factors by burying or otherwise insulating the separate chambers 34, 36 and 38 and the connecting pipe lines. At the building 59, the temperature of the common pressure chamber 58 and the indicator 62 can be controlled by regulating the temperature of the surroundings or enclosing the elements in a temperature-controlled atmosphere. Such measures will reduce temperature effects well below the required accuracy of the device.

The selected pressure component of the liquid level height, having been directed to the common pressure chamber 58 as the only pressure effect present, is then carried to the pressure cell 66 by way of the conduit 65 (see Figure 3) and chamber 41, thence by way of the flexible connecting conduit 64. This conduit must be long enough to extend to the maximum height required by the indicating mechanism. Also it should be guided to prevent entangling with itself and other lines. As a very small internal diameter tube is suggested, coiling on itself will not cause an appreciably false pressure measurement, as a minimum of pressure transfer through even a constricted cross-section is sufficient. Thus a plastic tube of very small diameter has been successfully used to transmit pressure by means of mercury as the pressuring liquid 60.

Within the cell 66, the now pressured liquid 60 of relatively high specific gravity is in physical contact with a less dense liquid 68 which could be a mixture of glycol and water as previously suggested. These liquids, mercury and the glycol-water mixture, are non-miscible and cooperate satisfactorily in pressure transfer. The liquid 68 fills the upper portion of cell 66, the connecting flexible conduit 86 and the lower dished portion in cell 84 below the flexible diaphragm 92. As a result of this pressure transmission, it being noted that there is no liquid movement anywhere in the measuring installation, the diaphragm is flexed upwardly or downwardly depending on the amount of pressure absorbed in cell 66 which is directly dependent on its height relative to the height of the volume of liquid being measured. As the diaphragm 92 is open on its upper surface to the effects of atmospheric pressure, the admitted atmospheric effect through the separate connections 28, 30 and 32 to the sensing mechanisms is counterbalanced, giving only the net pressure effect of the respective sensing elements 22, 24 or 26. It will be evident that pressure other than atmosphere, if equal, could be operative on each of the open ends of the system. Also an existing pressure in one end of a closed system could be balanced by an equal and opposite pressure on the other end. The balanced atmospheric pressure system described here seems simpler and more practical. By use of the support chamber 41 permitting sudden decreases of pressure without draining the system, the possible failure of the system by reducing pressure below that supported by the atmosphere is avoided making this the most adaptable form of device for the greatest differences in pressure conditions. To continue, with movement of the diaphragm, up or down, contact is made by the switching mechanism 96 completing either circuit 114 or 116, thus lighting either light 118 or 120. These lights may be marked "up" and "down" indicating the corrective movement required so that further adjustment can be made.

At this point both tapes 72 and 122 should be moved, simultaneously, in the indicated direction to lift or lower cells 66 and 84, until the glowing light is extinguished and the opposite indicating light glows. This means there has been a passage from a positive to a negative pressure or vice versa. Further adjustment of the elevation of both cells will narrow the rough measurement. Final, and exact, measurement is now obtained by holding the sub-assembly 63 stationary while moving cell 84 in proper direction until both lamps are extinguished. The more sensitive the diaphragm and switching mechanism are made, the more accurate the reading.

As was explained above, the bracket 132, fastened to the underside of cell 66, extends to engage cell 84. Preferred operation requires upward movement to be made by manually adjusting tape 72 carrying cell 84 with it. Downward movement is accomplished by adjusting tape 122 which carries cell 66 downwardly. Consequently exact measurement is best obtained by approaching the rough indication by cell 66 from below the approximate level, and completing the operation by moving cell 84 upwardly. Cell 84 not being attached to bracket 132 but merely engaging it can be moved upwardly for exact adjustment but cannot be moved downwardly, in this suggested arrangement, without moving cell 66. This structure can be changed readily to suit any desired installation requirements.

Reference to the graduations on the tapes 72 and 122 placed next to the fixed and movable scales shown in Figure 5 will make clear the operation of the disclosed device. Tapes 72 and 122 are calibrated in feet and inches and are adjusted to cooperate by showing the same area of the scale within the operating limits of the flexible connecting tube 86. The scales are marked on the tapes increasing, numerically, downwardly from the cells 66 and 84 where they begin at zero. Endless tapes shown here permit the scales to be carried over the length of the tapes as far as required, ending above the cells with the highest graduations.

Fixed scale 82 is marked on the left edge of the face, Figure 5, with the letters A to F inclusive. These letters represent storage tanks in the attended area such as are indicated by the numbers 10, 12 and 14 of Figure 1. The short horizontal line beside each of these letters is the datum line for the respective tanks carefully transferred by surveying or other levelling methods. On scale 82 separate datum levels are shown although it is possible one datum might be accurate for several tanks. In this situation, the several designating letters would be placed side by side. Or, as suggested above, pressure corrections, by properly elevating the pressuring chambers 34, etc., or building in a hydraulic back pressure, could be made to give one datum for all tanks. In any case the vertical correction of the index 83 to the selected datum point will give the pressure adjustment required to measure the stored liquid elevation in the selected tank.

Scale 87 is divided into sixteen equal parts representing $\frac{1}{16}$ of an inch as is shown in Figure 5. This is possible because of the relative specific gravities of the two pressuring liquids 60 and 68. In the example used later liquid 60 is mercury with a specific gravity of 13.6 and liquid 68 is a mixture of glycol and water with a specific gravity of 1.100. The difference of 12.5 is a measure of the relative responses of the liquids in pressure operation. For an inch of movement of the mercury column the glycol mixture will show 12.5 times the movement or 12.5 inches. Scale 87 is therefore 12.5 inches long equalling 1 inch of mercury movement. Consequently dividing this scale 12.5 inches long into 16 or more parts will enable measurement of stored liquid elevation into these fractions of an inch of mercury rise. As the mercury column in pressure transmitting conduit 64 measures the approximate height of the liquid stored in the tanks, the liquid column in flexible conduit 86 measures the fraction of an inch of elevation between the positions of the mercury column considered at one inch increments.

Storage tank A is selected for the example of measurement shown in Figure 5. Adjustable index 83 is slidably adjusted and clamped in place by a clamp at connection 89 of the index and adjustable scale 87. This adjustment lifts scale 87 to place the zero thereof on the A tank datum. By moving cell 66 upwardly to the approximate measurement where the "up" indicating light flickers, preparation for the exact measurement is completed. The tape 72 reads 13 feet 2 inches at this point on the scale in Figure 5. Cell 84 attached to tape 122 is then lifted until the "up" light is extinguished. This will light the "down" light if carried too far, or leave both lights extinguished at the exact measurement. At this desired point the diaphragm 92 is in balance having absorbed the pressure difference which cell 66 transmitted to cell 84. The diaphragm is supported parallel by the liquid under it and the switch mechanism 96 is not contacting either conductor 110 or 112. Reference to the tape 122 opposite the 13 feet 2 inches mark shows ⅝ inch on scale 87. The correct reading is therefore 13 feet 2 and ⅝ inches.

The flickering "up" light indicates tape 72 has reached an approximate reading at the measurement of 13 feet 2 inches. Further upward movement of tape 122 is required to obtain the final exact measurement. The basic measurement of 13 feet 2 inches is moved a fraction of an inch, in this case ⅝ inch, to extinguish both signal lights. Scale 87 accomplishes this finally adjusted reading, as shown in Figure 5.

Further consideration of the operating features shows that by leaving the pressure connection with this tank A, the electric lights will respond to pressure changes indicating upward or downward movement within this one tank. By complete closure of all pressure transfer valves, the device is made inoperative subject to later use. Or, by cutting off tank A and switching in another tank pressure through manipulation of the electrically controlled valves 46, 48 or 50, such other tank can be measured. Support chamber 41 assists in this sudden change by protecting against sudden pressure reduction draining conduit 64 of the pressure transmitting liquid. The index 83 is set as detailed above to the new datum mark for the selected tank, and the procedure followed as outlined.

Automatic indicating assembly

It will be evident that the above device, although efficient and accurate, has limitations. Constant attention is required and human errors are possible where careless or hurried use is made of the mechanism. Further, constant manual readjustment is required in order to follow the changing elevation of liquid in one tank, and no records are available other than those actually plotted by the attendant. The modifications of the above disclosed idea adapted to automatic liquid level indication and automatic recording are included in the subsequent figures of the drawing. Figures 6, 7 and 8 will be described as the automatic indicating mechanism, eliminating manual operation. The electrical circuits necessary to automatic operation are indicated schematically in Figure 6, simplifying the description and making this form of the device more readily understandable. The interlocking switches and relays completing these indicated circuits are repeated in further detail in later figures of the drawing and will be described with relation to them. Finally, Figures 9 to 13, inclusive, will add to the mechanisms already described, the recording elements making the device fully automatic.

A broad definition of the differences between the manually operated device previously described and the automatically operated mechanism now to be detailed will facilitate later description and assist in an understanding of the improved device. These differences are principally in the electrically actuated means to vertically move the two pressure cells 66 and 84 suspended by tapes. By transferring pressure from the first cell 66 to the second cell 84 and operating the vertical movement of the second cell by a reversible motor actuated in response to this pressure, the second cell is raised and lowered. Electrical contacts, completing a limited operating means relative to the first cell, are mounted on that cell for engagement by the second or motor operated cell. Further, by means of safety measures built into the vertically operating means the two electrical circuits are prevented from operating at the same time. Thus the indicating elements, the pressure cells and the calibrated tapes are moved separately and automatically in response to the pressure of the stored liquid until they reach an exact elevation indicating the correct measure of the elevation of the stored liquid.

In Figure 6, the basic indicator previously described will be recognized. The sub-assembly 63 is shown on the left and the second sub-assembly 85 on the right. The initial pressure cell 66 and second pressure cell 84 are also included. Figure 4, showing the details of cell 84 for the manually operated device of Figure 3, is also pertinent. Pressure transmitting conduit 64 transfers the pressure from the selected tank through the intermediate elements as already described. Also, two liquids 60 and 68 meet in non-miscible contact and transmit pressure through flexible conduit 86 to the under side of diaphragm 92 in cell 84.

Although certain elements noted and correspondingly numbered as being in common make the two forms of mechanisms in Figures 3 and 6 look alike, there are several major differences. These differences are caused by the automatic operation required of this modification. Tape 72 calibrated in feet and inches is placed adjacent a cell supporting tape 73 to which cell 66 is fastened. Both these tapes are suspended from an upper shaft but on separately rotatable pulleys 76 and 77 respectively. A lower shaft 78 is keyed to lower pulley 80 which mounts measuring tape 72, but is loose-journalled with respect to lower pulley 81 which mounts cell supporting tape 73. Shaft 78 terminates on one end in a ratchet wheel 75 which operatively cooperates with a solenoid actuator generally denoted by the numeral 79 later to be described fully as Figure 8.

A similar arrangement of dual tapes comprises the modified form of sub-assembly 85. The foot and inch calibrated tape 122 is similar to tape 72 and is used for measuring in cooperation with fixed scale 95 divided into fractions of an inch, as shown in Figure 7, and as explained for scale 87 of Figure 6. An index 97 foots scale 95 for easy reading of zero for this scale. An extension of this index 97 is shown as 99 opposite tape 72. Adjacent measuring tape 122, the cell supporting tape 123 is positioned for adjustable cooperation. Cell 84 is supported by tape 123. A pulley 126 rotatably mounted on shaft 124 supplies the upper support for tape 122. A separately rotatable pulley 127 supports tape 123 on shaft 124. The bottom loops of the tapes are engaged and guided by lower pulleys 130 and 131 cooperating with lower shaft 128. Tape 122 engages pulley 130 which is keyed to shaft 128. Pulley 131 is free to rotate on shaft 128. One end of shaft 128 is connected to a reversible motor 129 and is rotatably responsive to all motor movements.

Reference to Figures 6 and 7 will clarify the measuring means and datum points for storage tanks associated with this device. Clamps 71 and 121 are used to hold the separate pairs of tapes in operating relation with each other. The fixed indices 97 and 99 (here combined as 97) form the bases for measuring the liquid contents of the several storage tanks associated with this measuring device in contrast with the adjustable indices of the manually controlled device as described above. This system of relatively adjustable tapes permits the use of fixed datum points and consequent automatic operation. Flexibility in varying the elevations of the tanks relative to the measuring device is obtained by use of the separate cell supporting tapes 73 and 123 to be described later.

Associated with the pressure cells 66 and 84 in Figure 6 are cooperating electrical means which connect with the solenoid actuator means 79 and the reversible motor 129. These cell mounted electrical contacts will be recognized as automatically operated substitutes for manual control and the light signal arrangement of Figure 3. Mounted on cell 66 is a pair of spaced apart contacts 134 and 136. These are added to cell 66 of Figure 3, as is their cooperating contact 138 on cell 84 later to be explained. The spacing between the contacts 134 and 136 is related to the difference in specific gravity between the pressured and pressuring liquids 60 and 68 as explained above. Still considering mercury and a glycol-water mix as the two liquids used in the device, this spacing will be 12.5 inches. Pressure is transmitted between cells 66 and 84 by a flexible conduit 86 as shown in Figure 6 and as explained with reference to Figure 3.

The electrical connection between the cells is intermittent and is made by the added contact 138 on cell 84 which extends between contacts 134 and 136 in projection from cell 84. To insure positive contact and resulting circuit completion, contacts 134, 136 and 138 are magnetized with permanent fields. In addition to this contact 138 which engages cell 66 contacts 134 and 136 at the extremes of its pressure-caused travel, cell 84 also mounts the diaphragm switch responsive device noted and described in Figures 3 and 4 as number 96. Thus the pressure received by cell 66 and transmitted to cell 84 operates switch 96. Conductors 104, 116 and 118, together with power source 204—205 and field windings 148, complete a schematic electrical circuit between switch 96 and reversible motor 129, indicating the operation of cell 84.

As cell 84 moves upwardly and downwardly in response to the movement of pressure operated switch 96 and the corresponding response of reversible motor 129, thus moving tapes 122 and 123, contact is made and broken with contacts 134 and 136 on cell 66. Conductors 150, 189 and 154 connect contacts 134, 136 and 138 with the solenoid actuator means 79 through the symbolized power means 204—205. As noted above, the wiring diagram in Figure 6 is schematic only with relation to this solenoid switch means 79 and the reversible motor 129. The details of the wiring of the actuator 79 will be described in relation to Figure 8.

Reference to Figure 8 shows the solenoid actuator means 79 as an end view of Figure 6, enlarged to show the detail of the operating parts and electrical circuits. To make this actuator means understandable, the pressure cells 66 and 84 are shown diagrammatically in electrical connection with the solenoids. Additionally, motor circuit relays 215 and 216 are included in the electrical assembly as are the several conductors which will later substantially complete the recording combination of this invention.

Side views of tape 73 are positioned above ratchet wheel 75 which is mounted on the end of shaft 78. This ratchet wheel is divided into twelve notches dimensionally limited to move the tapes 72 and 73, clamped together for simultaneous and equal movement, and cell 66 vertically one inch at a movement, and no more, during the measuring operation.

Solenoid actuators 135 and 137 are spaced transversely of shaft 78 to diametrically engage ratchet wheel 75 on opposite sides. The plungers 139 and 141 of the actuators 135 and 137, respectively, project upwardly and engage ratchet wheel 75 with the pawls 143 and 145. Typical soft iron cores 147 and 149 fit in the upper apertures of the bodies 159 and 162 of the respective actuators, embracing the plungers 139 and 141. Interlocking electrical contacts 158, 160, 133 and 161 are paired to the solenoid responsive plungers 139 and 141 and operate as a safety feature preventing excitation of both solenoids at the same time. Flexible diaphragms 163 and 164 are connected to operate with the plunger movement by plates 165 and 166 threadedly connected to the plungers beneath the diaphragms for gravity effect.

Horizontally mounted brackets 167 and 168 divide the actuator bodies 159 and 162 into approximately two equal volumes below the flexible diaphragm mountings. The brackets are centrally apertured to mount a second pair of diaphragms 169 and 170 held in place by seal rings 171 and 172. These second diaphragms mount insulated plungers 173 and 174 to which contacts are attached forming an interlocking control between the reversible motor 129 (shown in Figure 6) and the actuator circuits. In actuator 135, plunger 173 mounts two movable contacts 175 and 176 in cooperation with bracket supported, fixed contacts 191 and 192. A like arrangement mounts contacts 177 and 178 on plunger 174 with fixed contacts 194 and 195 in actuator 137. Vent means connects the volumes above and below the brackets 167 and 168 in the respective actuator housings and includes pipes 179 and 180 on which apertured, hinged caps 181 and 182 are mounted respectively. The two sizes of apertures available in such a hinge capped pipe arrangement facilitates the solenoid operation, as will be later understood.

*Automatic indicating device operation*

The solenoid actuators 135 and 137 detailed above are electrically connected between the cells 66 and 84 to move one in response to the movement of the other. As noted above, cell 84, in response to fluid pressure delivered to it from cell 66, operates switch 96 to excite motor 129. The motor raises or lowers cell 84 until contact 138 engages either contact 134 or 136 thus completing a circuit with either actuator 135 or 137.

If the movement of cell 84 is upwardly making engagement between contacts 138 and 134, conductor 150 is excited, energizing the solenoid of actuator 135. However, the soft iron core 147 of actuator 135 cannot be energized unless the interlocking contacts 158 and 160 of cooperating actuator 137 are engaged. When so engaged, as illustrated in Figure 8, an operating circuit is completed with the power sources 204 and 205 and actuator 137 is immobilized. Tracing this circuit from contact 134 with power source 205, the current in conductor 150 energizes solenoid core 147, passing through conductor 140 to safety contacts 158 and 160, to conductors 152 and 125 to power source 204. Plunger 139 then lifts as shown in Figure 8, urging ratchet wheel 75 around, clockwise, one notch. The stop 217 halts plunger 139 against any further movement upwardly. Tape 73 is moved vertically, changing the vertical position of cell 66 exactly one inch upwardly. This movement separates contacts 134 and 138, breaking the circuit. However, during the contact and within the body 159 of the actuator 135, flexible diaphragm 163 is lifted with the upward movement of plunger 139. The diminished pressure in the portion of the body 159 above the bracket 167 causes the second diaphragm 169 to move upwardly, closing contacts 175 and 191 as shown in Figure 8, and opening contacts 176 and 192. The negative polarity of the power source 205 momentarily transmitted through conductor 150 is passed from conductor 157 through these contacts to conductor 190 back to source 205 but not completing a circuit. However, at the juncture of conductors 150 and 157, this negative power component splits, flowing through the solenoid coil and connecting wire 140. A circuit is completed through contacts 158 and 160, as solenoid actuator 137 is quiescent, through conductors 153 and 142 to the positive power source 204.

This same upward movement of diaphragm 169 disengages contacts 176 and 192. By so doing the motor circuit through conductor 186 is rendered inoperative and the possibility of both pressure cells 66 and 84 moving simultaneously prevented.

Further, externally of the actuator, as contacts 133 and 161 are physically connected to the plunger 139 and the body 159 respectively, their movement apart prevents current from flowing through conductors 125 and 153, which in turn prevents solenoid core 149 of actuator 137 from being excited, thus completing the safety feature of the interlocking circuits to prevent excitation of the solenoids of both actuators 135 and 137 simultaneously.

It will be noted that the engagement between contacts 138 and 134 which imparts the necessary negative operating current for actuation of solenoid 135 is only momentary in duration, made positive, however, by the use of magnetized contacts as described. The circuit outlined above must be supported, further, to complete the required upward movement of plunger 139. This is accomplished by the "holding" circuit formed by the moving contacts in the base of solenoid actuator 135, as just described.

Energized in this fashion, solenoid actuator 135 completes the upward movement of plunger 139 completing the movement of cell 66. The bleeder pipe 179 with the hinged, perforated flap 181 covering the end in the lower chamber, releases the operating suction in the upper chamber of the solenoid housing 159. Unsupported diaphragm 169 subsides, breaking contacts 175 and 191 apart, discontinuing the holding circuit traced above and allowing plunger 139 to drop to the inactive position.

The lift of the second diaphragm 169 by the upward movement of the first diaphragm is caused by increase of volume in the body space above bracket 167. Hinged cover 181 on vent pipe 179 is apertured at 183 permitting a controlled interchange of air or gas movement, if an inert gas is used to fill the switch body, between the volumes. The upward movement of diaphragm 169 is allowed to operate without rupture or strain, in both directions.

Solenoid actuator 137 shows the other operating position common to both actuators. The active and inactive positions are assumed by either actuator as required by the pressure controlled movement of cells 66 and 84. It will be evident that conditions may require successive movement of both actuators in alternation, or repetitive movement of either actuator to reach the pressure balanced position for the height measuring cells. The active position of operation has been considered in describing actuator 135 as shown in Figure 8. The inactive position will be described in relation to actuator 137. It will be understood that there is no other position between these two. The actuator in either instance is either electrically excited or it is not. In the quiescent condition, both the actuators 135 and 137 assume positions similar to that of 137 by gravitational effect in which the lower contacts 176—192 and 178—195 respectively are engaged. Conductor 186 is energized from power source 205 through conductor 190 for purposes of operating motor 129. Figure 8 shows this arrangement schematically while Fig. 9 shows the complete connection between the solenoid and motor circuits in detail. Otherwise there is no current flowing in either the actuator "initiating" or "holding" circuits. This will be clear after reading a discussion of the operation of these sub-combinations in relation to the whole mechanism.

The positions of the two solenoid controlled actuators shown in Figure 8, as will be fully described later, illustrates the action following the upward movement of cell 84 into engagement between contacts 138 and 134. The circuit, described above, is the result of this electrical engagement and actuator 135 responds to move cell 66 upwardly. This action, alternating between upward movement of cell 66 in exactly one inch increments and the movement to contact of cell 84 operated by motor 129, will continue until pressure balance in the cells 66 and 84 is achieved, or until a required downward movement of cell 84 brings contact 138 into engagement with contact 136 when actuator 137 will be energized to reverse the operation moving the cell 66 and cell 84 alternately downwardly.

Based upon the above detailed description of the elements of Figure 8 and their functions, comparatively little more need be added to complete a description of the operation of this automatically operated indicating form of the invention. Proximate the calibrated tapes 72 and 122 are cell supporting tapes 73 and 123. These are adjustable relative to the calibrated tapes and show markings such as letters A, B, etc. only. These indicate the relative datum points for like lettered storage tanks and are reproduced on the calibrated tapes at properly related intervals. Thus by matching letters, such as A—A shown for both sets of tapes in Figure 7 and clamping the calibrated and cell supporting tapes together as by clamps 71 and 121, the device is corrected for liquid elevation reading for any selected storage vessel relative to the indices 99 and 97. With the tapes clamped together for the selected tank, the datum is established and measurement can be taken.

As described in connection with Figure 6, the pressure from the selected storage tank is transmitted to cell 66 through conduit 64. The liquid 60 receives the pressure in cell 66 and passes it to cell 84 through conduit 86 by means of liquid 68. Diaphragm 92 responds either upwardly or downwardly causing switch 96 to excite the reversible motor 129 resulting in vertically moving cell 84. Contact 138 forming part of a circuit electrically separated from that of motor 129 and switch 96, completes a circuit with either contact 134 or contact 136. The result is to energize a selected actuator which moves cell 66 either up or down exactly one inch. Such movement separates contact 138 from either 134 or 136 by that much.

If the operating pressure which affects cell 84 still persists, the movement by reversible motor 29 responding to the diaphragm effect on switch 96 of cell 84 causes this cell to move into engagement with the same contacts and continue the operation. Cell 66 is then moved in the responsive direction one inch at a time by the responding actuator until pressure balance is reachd in cell 84. This may be at any position between contacts 134 and 136 but never in engagement.

The approximate elevation having been reached by cell 66, the slight pressure differential remaining in that cell is transmitted to the diaphragm 92 in cell 84. Switch 96 continues to excite motor 129 as in the previous operation until contact is broken by pressure being removed from the diaphragm. As both actuators are in the inactive position contacts 176—192 and 178—195 are engaged and the motor circuit is operative. At this point pressure is balanced between the storage vessel selected and the hydraulic head reached by cells 66 and 84. It remains to measure the indicated stored liquid elevation on the tandem tape means shown in Figure 6.

Consideration of the enlarged portion of the tapes 72, 73 and 122, 123 of Figure 6 as shown in Figure 7 will clarify this feature. Tapes 72 and 122 are calibrated, alike, in feet and inches. Both these tapes are responsive to the movement of their operating mechanisms, namely, the motor 129 and the actuator means 79, respectively. This tape movement is accomplished and accurately controlled, in one way, by perforating the tape and passing it over a studded wheel splined to the proper shaft. Such a studded wheel is indicated in Figure 10. Spaced magnetic cores 249 are held in place by the magnetic field 214 (Fig. 10) insuring exact movement.

By the described operation in which liquid pressure is interpreted into an elevation measurement electrically, tape 72 shows a measurement of feet and inches against index 97. In this instance (Fig. 7), 40' 2" is the reading on tape 72. Pressure in cell 84, however, required further, adjusting movement between the spaced apart contacts on cell 66. This spacing is of the order of 12.5 inches for mercury and glycol-water mixture as previously described and limits the extent of scale 95. Consequently the vertical movement of cell 84 and the tapes 122 and 123 indicates the fraction of an inch necessary to correct the rough or approximate reading. On scale 95 opposite 40' 2" on tape 122, this fraction of an inch is read as 7/16 inch.

Automatic recording assembly

It will be evident to those versed in the art by reference to the figures of the drawing that the recording mechanism adapted for use with the automatic device described, requires little modification in the previously described combination. To be of any use, such a recorder must be operated by the elements already incorporated in the mechanism, and respond exactly with the elevations indication of the reading means. These results are achieved by inserting an especially designed recorder, adapted to show feet, inches and fractions of an inch measurements, in the existing electrical circuits. As these measurements are the result of two separately operating, but connected elements, the recording elements require time control for successive operation and satisfactory results. The following description will insert the preferred recording elements into the combination and show necessary alterations to the described electrical circuits.

This recording mechanism by which the indicating devices described above become fully automatic is illustrated in the remaining figures of the drawing, namely 9 to 13, inclusive. It will be understood that all the flexibility of adjustment for different datum points are usable with this recording mechanism. However, for clarity of drawing and description, the tandem tape device of Figure 6 is reduced to two single tapes adapted to measure from a fixed datum. This is possible by carefully constructing the storage vessels to use a single datum, or by absorbing pressure differences in the transmission system before the pressure reaches the indicating, or in this case recording, mechanism. These system modifications have been mentioned above.

In Figure 9, with the exception of completing the circuits for the relays in the motor circuit and the addition of the recording mechanism with its attendant electrical connections to the already described operating electrical circuits, the greater part of the combination has been described. Where possible numerals previously used will be retained and the nomenclature preserved.

Reference to Figure 9 shows the now familiar pressure receiving cells 66 and 84 schematically arranged as previously disclosed in Figure 8; the conductors are numbered and serve the same purposes as described in the latter figure. Tapes 72 and 122 each engage a respective lugged wheel for exact control as previously suggested and as illustrated in Figures 10 and 11. Wheel 130 in addition to the spaced lugs which engage a slotted tape has a plurality of spaced magnetic cores which are retained in a magnetic field set up by the magnet 214. By such means the tape 122 is positioned when motor 129 stops assisting the recording mechanism. Except for this and similar details of the elements of the recorder adapted to connect with these previously described elements and sub-combinations and make record of feet, inches and fractions of an inch of liquid level through pressure principles, the figure is a schematic representation of the device. The actuators 135 and 137 exemplify this schematic arrangement in that they are placed side by side for clarity of description. To keep them operable in this position, however, the plungers are equipped with crossbars 219 and 220 respectively to rotatably operate gear wheels 221 and 222 in opposite directions. Wheel 221 is positioned to engage shaft 226 as part of the recording operation while wheel 222 is fastened to sleeve 229 performing another recording operation. The purpose of elevating and lowering the tapes is served and broadened to include the recording function.

Continuing with reference to Figure 9, tape 72, graduated in feet and inches and apertured to engage a lugged wheel 80, supports cell 66 as described for Figure 3. Tape 122 serves a similar purpose, in the same way, relative to cell 84. The centers of wheels 80 and 130 are aligned with the operating shaft of the recorder denoted generally as 224 and cooperates therewith.

Shaft 223 supported in alignment with the recorder mechanism 224 as by bearing 225 holds gear wheel 221 in operating position engaged by the actuators 135 and 137. Shaft 226, preferably shaped or splined as a sixteen-sided polygon (Fig. 12) extends from a like shaped center 227 in wheel 221 through a clearing aperture 228 in the center of wheel 222, through sleeve 229, solenoid 230, to stop adjacent a shaped aperture 231 adapted to receive shaft 226 in operating engagement in the center of wheel 130. A holding solenoid 250 electrically connected as will be fully described later encloses shaft 226 and cooperates with solenoid 230. Shaft 226 is constructed to present properly positioned electrically responsive sections for cooperation with these solenoids. A supporting shaft 232, coupled to motor 129, supports wheel 130 in cooperating position to receive the polygonal shaft 226. Spring means 233 positioned to cooperate with the solenoid 230 and the shaft supported collar 234 completes the operating means for transverse movement of shaft 226 into and out of engagement with respective gear wheel 221 and tape operating lugged wheel 130.

Figure 13:
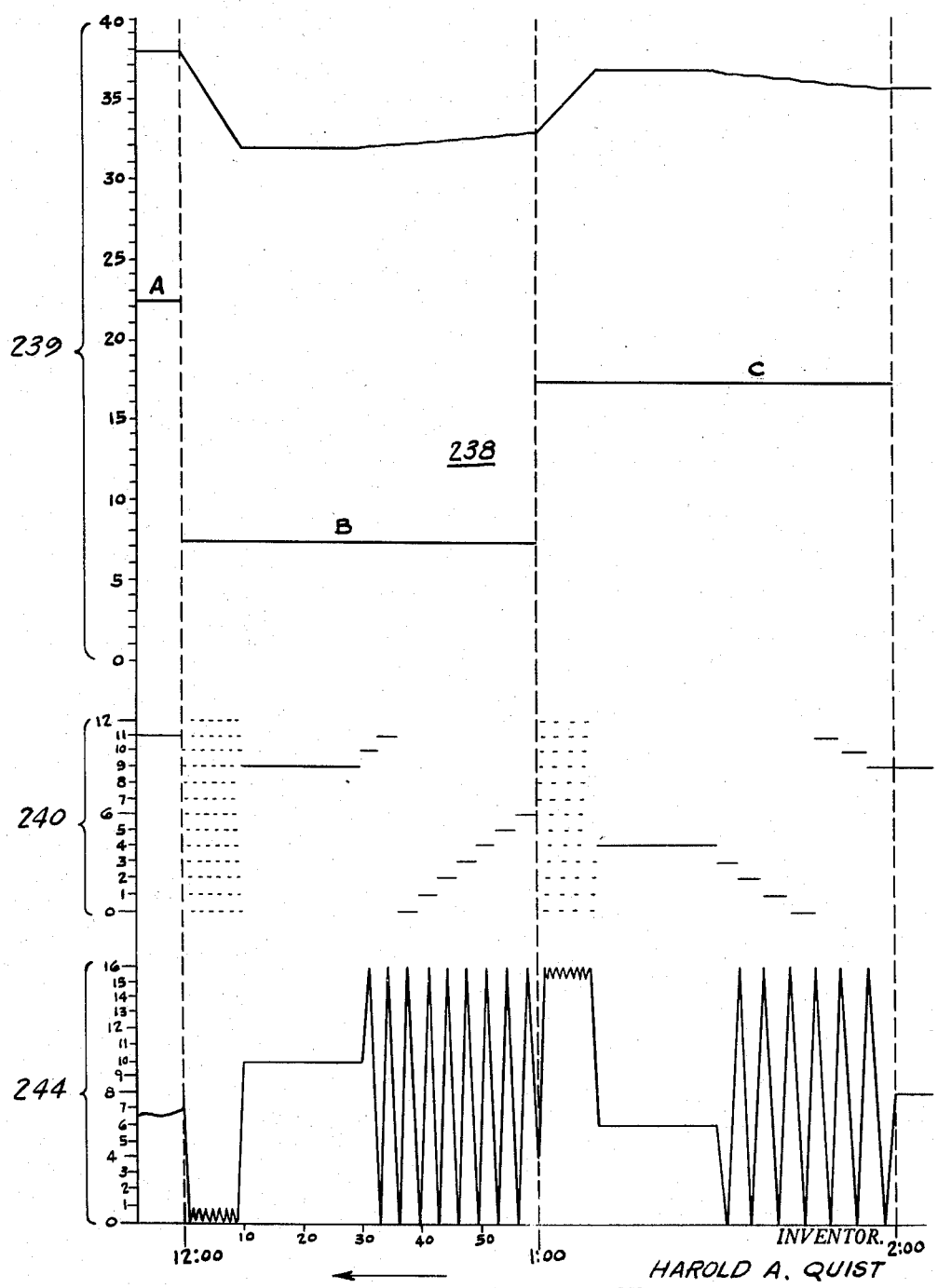
Figure 13 is a facsimile reproduction of a recording chart as produced by the recorder shown in Figure 9.

Gear wheel 222 and lugged wheel 80 are connected to sleeve 229, directly transmitting foot and inch information from the movement of tape 72 to the recording elements of recorder 224. For a limited distance on sleeve 229 a threaded section 235 mounts a stylus 236 which is positioned by the guide 237 to engage the chart surface 238. It will be understood, by reference to Figure 13 of the drawing, that the pitch of the screw threads on threaded section 235 is adjusted to encompass the operating height of the tank relative to this portion of the chart area. This particular section, denoted by the numeral 239 on Figure 13, is the foot recording portion of chart 238.

Immediately adjacent this foot recording section 239 of the chart is an inch recording section 240. The rotary motion of sleeve 229 cooperating with the movement of the chart as indicated by the arrow on Figure 11 records this measurement. The remaining portion 241 of sleeve 229 beyond the threaded section 235 is drilled to space twelve pencil-like marking means 242 equally about the circumference of the sleeve. Longitudinally, the spacing is selected to meet the requirements of the chart 238 and the time spacing thereon. As will be made clear in discussing the operation of this recorder, there is a necessary relationship between this spacing of the pencil-like marks, the threaded portion of the sleeve, the gear wheels 221 and 222, the lugged wheels 80 and 130, and the relative specific gravity of the liquids operating in and on cells 66 and 84.

Separated from the sleeve 229 but in cooperation with the chart 238, a second stylus 243 engages the fraction-of-an-inch portion 244 of the chart. Stylus 243 is bifurcated on the upper end fitting slidably on shaft 226 in the scribing position. The threaded shank 245 engages internal threading in splined sleeve 246 which is externally engaged by gear 247 on polygonal shaft 226 and is, consequently, operated thereby.

Figure 11 taken as a sectional view adjacent gear 247 shows this detail in cooperating relation. This figure considered in conjunction with Figure 9 shows the operating structure linking chart driving motor 212 through gear train 213 to roller 248 which holds the chart 238 in scribing position. It will be understood that additional supports are required for the chart as well as for the elements as described. These are readily supplied as a mechanical solution of a problem needing no invention, and are omitted for clarity in the drawings.

Additionally, Figure 11 shows a diagrammatic extension of the valve operating circuit which controls the admission of pressure from selected storage vessels, to automatically mark the chart with an indication of the measured vessel. Switch 103 controls, for example, valve 46 attending storage vessel A (Figure 1), which is normally closed. Electrical excitation of this valve by closing switch 103 completes a circuit through the conductors 105 and 107 and the power source 109, energizing relay 111 and moving marking means 113 into contact with chart 238. As long as this circuit is effective the marking means will scribe the chart. Breaking the circuit by any means removes the marking element. In addition to making the device fully automatic by thus indicating the vessel being gauged, this is a safety feature indicating operativeness of the mechanism. By using a plurality of elements, one set for each valve circuit, and placing the mark immediately proximate the chart marking elements as indicated in Figure 11, complete and accurate coverage of this feature is made possible.

In addition to the operating relation of the several elements, these figures show a magnetic control, mentioned above, for the stable operation of lugged wheel 130. A permanent magnet 214 is positioned to embrace the periphery of wheel 130. Magnetic cores 249 are spaced in the body of the wheel 130 to be responsive to the magnetic field and to orient the wheel at a desired point after each movement.

Before describing the recording operation, it is necessary to mention some additional electrical elements added to insure proper and correct operation of the recording mechanism. To the basic electrical circuit of Figure 3, expanded in Figures 6 and 8 to the automatic indicating mechanism, it is necessary to insert several electrically operated elements. The normally closed relay 251 is let into common motor conductor 203 as a safety feature. A holding solenoid 250 previously mentioned cooperates with operating solenoid 230 in restraining the effect of spring 233 on shaft 226 until the proper time. And time delay switches 252 and 253 cooperate to control the movement of floating shaft 226 in its recording operation.

*Recording operation*

To illustrate the accuracy and flexibility of the recording mechanism, and to emphasize the cooperation of the disclosed elements as a new combination, a storage operation will be detailed. The preliminary details of selecting the storage tank to be measured and tracing the pressured liquid to the responsive cells 66 and 84 is as previously described and will not be repeated here. It will be understood, further, that the liquids described above having different specific gravities resulting in the pressure difference of 12.5 inches will be retained. Consequently the relative vertical movement for the same pressure will be one unit for cell 66 and 12.5 units for cell 84 thereby retaining the spacing of contacts 134 and 136 of cell 66 as previously described.

The chart shown as Figure 13 will be described in general, and then used, in detail, as a guide for the description of the recorder operation in response to various storage conditions. By this means the flexibility of the apparatus will be apparent. Further, the description given previously of the simpler devices can be utilized and the added elements of the latter more complex mechanism more readily understood.

Figure 13 shows a typical chart on which the information of all normal functions of storing liquid in a number of separate tanks, recorded by one instrument, is collected. Tanks A, B and C are considered as illustrative of the group and the operations arranged to place the greatest possible burden on the sensing, indicating and recording means. For a short period of time before 12:00 o'clock, tank A is shown as holding 37' 11⁷⁄₁₆" of stored liquid. As the electrical circuit opening the valve 46 allowing tank A pressure to be transmitted to the measuring mechanism is energized, marking means 113 is scribing the chart 238. In Figure 13, this operation is indicated by physically displacing these markers, one from the other, to indicate the tank being measured. Different colors, inked stamps, symbols or letters, all may be used as desired.

Stylus 236 recording feet is steady as is the pencil 242 which records inches. Tape 72 which raises and lowers cell 66 one unit at a time as actuated by the respective solenoid actuators 135 and 137 previously described has remained stationary since the last actuation for change of liquid depth. Any change of liquid volume and resultant depth is the result of the effect of temperature, and, evidently, has not amounted to an inch of change. This is pictured by the wavy, slightly upwardly moving line in the fraction of an inch portion of the chart reaching ⁷⁄₁₆ of an inch at 12:00 o'clock.

This increase in recorded depth is the result of temperature effect. An increase in volume is transitted by the level sensing element in tank A through cell 66 to cell 84 where the diaphragm operated switch electrically excites the motor 129. A slight motion of the motor rotates floating shaft 226, held in engagement in socket 231 by springs 233, moving stylus 243 by turning gear 247 and splined-threaded sleeve 246. As is evident from the chart record this movement is very slight.

At 12:00 o'clock when the charted depth of liquid in tank A is 37' 11⁷⁄₁₆", the operator marks the chart with the symbol for vessel B by switching the pressure transfer valve 48 to the open position closing valves 46 and 50, thus letting the sensing mechanism of tank B connect with the recording device. The transmitted pressure from this tank is assumed to be less than that of tank A to show the flexibility of the device. A depth of liquid in tank B is assumed to be 31' 9⅝", a difference from that in tank A of 6' 1¹³⁄₁₆". Grids normally used on such charts as in a different color are omitted here for clarity.

In view of the previous description of the effects of pressure in cells 66 and 84, it will be immediately evident that this pressure decrease requires these cells to move downwardly. Referring now to Figure 9, these pressure cells, in indicating the depth of tank A (38' 11⁷⁄₁₆") are almost in contact at the uppermost position. Now cell 84 subjected to relatively decreased pressure from tank B is moved downwardly by the effect of the diaphragm responsive switch mechanism 96 on the motor circuit. As noted in relation to Figure 3, support chamber 41 and the grid supported diaphragm 43 maintain the column of operating liquid in conduit 64, preventing the creation of a vacuum. The condition considered here is the reason for including support chamber 41 in the device. Under conditions of small pressure differences such a chamber is not needed. Motor 129, excited from the positive power source 204, through conductor 104, switch 96, conductor 116, relay 215, conductor 186, by-passing both solenoid actuators as both are in the inactive position, through conductor 190 to the negative power source 105. As a result of completing this circuit, relay 215 is actuated, and the motor circuit through conductors 206, 207 and 208 with common conductor 203 through normally closed relay 251 causes motor 129 to rotate wheel 130, bringing cell 84 down on tape 122. All other circuits are inactive.

This motion of motor 129 lowering cell 84 by rotating wheel 130 and vertically moving tape 122, also rotates floating polygonal shaft 226. Springs 233 hold shaft 226 in aperture 231 and disengage it from aperture 227, as neither of the solenoids 230 and 250 are activated. Gear wheel 247 rotates in turn rotating splined-threaded sleeve 246 moving stylus 243 the full length of its travel as indicated on the fraction-of-an-inch portion 244 of the chart as shown on Figure 13. The downward travel of cell 84, 12.5 inches in our problem, continues in response to the motor movement, and brings magnetic contacts 138 and 136 together.

The immediate effect of these contacts meeting is to energize the normally closed relay 251 by completing the negative circuit from contact 136 through conductors 189 and 254. The positive source is connected through conductors 104 and 255. Motor 129 is disconnected from the previously formed circuit as relay 251 opens, halting the downward movement of cell 84. Simultaneously solenoid 230 is activated through conductors 189, 198 and 200 exerting an electrical pull on floating shaft 226 to slide it to the left into engagement with aperture 227 in gear wheel 221. This polygonally formed shaft 226 is oriented between these apertures for immediate and accurate engagement by means of the magnetic field 214 influencing the stopping position of wheel 130 in its effect on the cores 249.

Solenoid actuator 137 adapted, as previously explained, to move cell 66 downwardly when solenoid actuator 135 moves it upwardly, is next brought into operation. However, to gain sufficient time delay for the horizontal movement of floating shaft 226, a standard time delay mechanism 253 holds back the electrical energizing of coil 149 until the shaft is moved. Then by closing its contacts the negative source 205 is connected through conductors 199, 189, contact 136 and conductor 154. Circuit completion to positive source 204 is reached through holding solenoid 250, contacts 133 and 161, and conductors 125 and 104. By thus energizing holding solenoid 250, shaft 226 is firmly seated and will be held there after solenoid 230 is released during operation of the basic circuit. Solenoid 250 is provided with an additional operating winding (not shown) which is connected into circuit with solenoid actuator 135 in a way exactly similar to the way in which the illustrated winding of this same solenoid is connected into circuit with solenoid actuator 137. Thus, when actuator 135 is brought into operation to move cell 66 upwardly under different conditions, solenoid 250 will be similarly energized and will perform its function of seating shaft 226 firmly in aperture 227.

The upward lift of solenoid actuator 137 moves gear wheels 221 and 222 in opposite directions one complete notch lowering cell 66 exactly 1 inch. As explained previously in relation to Figure 8, the motor circuit contacts in the base and associated with the plungers further open the motor circuit to prevent unintentional movement of cell 84, and prevent the unoperated solenoid actuator 135 from simultaneously operating, thereby damaging the mechanism.

By thus interlocking the safety elements, the operation of one and one one moderating device at an instant of time is assured. In this example, the relatively low pressure in tank B switched into operation after tank A, continues to urge the pressure cells 66 and 84 downwardly. Contacts 138 and 136 are brought together by motor 129 operation and separated step-by-step in 1 inch increments by cell 66 dropping downwardly as controlled by solenoid actuator 137. The result of this movement is illustrated on the chart in Figure 13 for a space of time immediately following 12:00 o'clock.

For clarity of description, a period of ten minutes is used to show the effects of the above described sensing elements movement on the recording mechanism. The feet indicating stylus 236 moves irregularly, in response to the stepping operation of wheel 80 pulling tape 72 downwardly. On the chart this is shown as a comparatively straight line, it being postponed until a pumping-in operation in tank B is considered before showing the effect of the step-by-step operation on the chart. Even by extending this levelling-off period over ten minutes of chart space where it actually is performed in much less time, the feet line is, for all intents and purposes, straight.

The inch indication, however, is a plurality of data moving from zero back to zero for every foot of drop on the feet section. This will be clear when reference is made to the plurality of pencils 242 arranged as a helix spaced at the inch spots transverse the direction of chart movement. By using zero and 12 as an indication, this chart is simplified and easily read by reference to the foot portion previously explained.

Considering now the fraction of an inch portion of the chart which is operated by cell 84 through the motor 129 and the floating shaft 226, a difference in marking characteristics not the simple result of speed difference is evident. By explaining this difference in detail, the means for securing accurate and exact readings will be clear as will the reason for the specific structure used.

The transition period between 12:00 and 12:10 presently being considered, shows a wavering line for the fraction of an inch stylus marking on the chart. This is close to the zero line of the scale wavering slightly above it. When cell 84 dropped from its elevated position relative to contacts 134—136 of cell 66 because of the rapid decrease in the pressure of liquid in tank B, the motor response moved stylus 243 to this zero line. As the relatively lower pressure persists, cell 84 continues to descend contacting cell 66 and stepping it downwardly. These short alternate periods of motor engagement and disengagement operating on shaft 226 floating into and out of engagement because of electrical circuit re-excitation, causes this charted condition. When cell 66 is driven down to the lowest altitude supported by the pressure of tank B and the feet and inch stylus no longer moves, the remaining fraction of an inch pressure lifts cell 84 to the balancing position. This movement operates the reversible motor through the proper motor circuit, shaft 226 engages the motor operated wheel 130 being urged into contact by spring 233, and the stylus 243 moves to indicate ⅝ inch.

The horizontal movement of floating shaft 226 placing it either in engagement with motor 129 or wheel 221 in which it responds to movement of either cell 84 or 66 respectively is controlled by spring 233 and solenoids 230 and 250. By arranging the elements as shown in Figure 9, the respective operations on shaft 226 are opposed to each other which permits charting a condition such as has been described above, and also permits the ultimate reading in fractions of an inch to be achieved. This horizontal movement is facilitated by using two solenoids, a moving solenoid 230 and a holding solenoid 250.

Tracing the circuit of the moving solenoid 230, it is excited to move floating shaft 226 into engagement with gear wheel 221 when cell 66 is moved. When motor 129 moves, this solenoid is not activated, permitting springs 233 to operate. Hence solenoid 230 is electrically connected through the solenoid activators 135 and 137 and the time control relays 252 and 253 associated with them. The shaft 226 is moved from contact with motor 129 into engagement with wheel 221 before the solenoid actuators operate. This is a function of the time control relays which synchronize these relative movements after either contact 134 or 136 is engaged by contact 138 of cell 84 answering a transmitted pressure condition.

Although these contacts are magnetized to insure full and continued engagement to transmit the electrical operating impulses to the connected elements, once separated far enough all contact is broken and solenoid 230 is deactivated. This can happen while shaft 226 is being rotated by final movement of wheel 221 completing its operation. It is necessary, therefore, to hold shaft 226 in engagement with wheel 221 and prevent it from engaging wheel 130 until it is oriented for both accuracy and freedom from equipment damage. Solenoid 250 does this until the time control relays 252 and 253 break the established circuits.

Further consideration of the chart of Fig. 13 shows tank B standing for the next twenty minutes with the established depth of stored liquid at 32′ 9⅝″. No slight increase or decrease in liquid height is shown as this was explained above, and is omitted here for clarity. It will be understood, however, that the possibility of continuous change of sufficient depth to be recorded is the normal condition rather than the exception and will be charted by the disclosed device.

At 12:30 the chart indicates an increase in stored liquid level such as is obtained by a "pumping-in" operation. The transfer of pressure conditions between tanks A and B discussed above considered a rapid change. That was spaced over a ten-minute period on the chart for ease of description although it would possibly take place in a fraction of that time. This pumping-in condition is a more gradual increase in stored liquid level and covers a longer period of time. All the recording elements are permitted to function completely, and the resulting chart differs, in some respects, from that previously considered.

Between 12:30 and 1:00 o'clock the pumping-in operation is assumed to increase the liquid elevation in tank B from 32′ 9⅝″ to 33′ 6¼″ or a depth of 8⅝″ which in a 114′ 6″ diameter tank is the equivalent of 1320 barrels, making a pumping rate of 2600 barrels per hour which is within the limits of good practice. As soon as the effect of the pumped-in liquid, changing the elevation of the liquid level, is felt by cells 66 and 84, the diaphragm switch 96 of cell 84 excites the motor circuit for upward movement which is different from that for downward movement already described. Positive pole 204 is connected to conductor 118 through conductor 104 and switch 96 which closes relay 216 by completing the circuit to negative pole 205 through conductors 186, 202, 190, 154. The rotation of motor 129 is reversed from the preceding problem and cell 84 is lifted.

Tracing this movement on the chart, stylus 243, motor activated, shows cell 84 moves up to make contact between contacts 138 and 134. Cell 66 is moved up exactly one inch by solenoid 135 operating through the previously disclosed circuits and time control relays after floating shaft 226 has been moved to engage wheel 221 in response to operation of solenoid 230. This 1″ vertical movement of cell 66 rotates floating shaft 226 contrary to the previous motor rotation and starts stylus 243 from the 1%6 inch mark back toward the %6 inch mark.

Further this 1 inch vertical movement of cell 66 resulting from the upward movement of cell 84 urged by transmitted pressure immediately reduces the pressure in cell 84 so that this latter cell moves downwardly until sustained by pressure reversing the motor through the diaphragm switch in that cell. The relative movements of these cells will be remembered as the relationship between the specific gravities of the liquids used to pressure them explained early in this application. With the motor controlled downward movement, the fraction of an inch stylus is returned the remaining distance on the chart and begins the return movement when the pressure under the diaphragm again reverses and is increased by the pumping-in operation.

This relative movement of the pressure cells 66 and 84 with attendant recording element response continues until the pumping-in operation ceases. When the movement of cell 84 ceases on contact with cell 66 and the recording mechanism is operated by the solenoid actuators, that portion of the recorder containing the feet and inches stylus 236 and 242 is operated. The foot marks are shown as being stepped in increments of 1 inch elevation movement of cup 66, controlled by the thread on portion 235 of sleeve 229 and the movement of chart 238. The inch marks are the result of the correct one of the peripherally spaced pencils being rotated into contact with the chart by means of the solenoid actuators limited to the one inch movement of the ratchet and pawl mechanism. Reference to the chart above shows the increase in liquid level recorded from 32′ 9⅝″ at 12:30 to 33′ 6¼″ at 1:00 o'clock.

Between 1:00 and 2:00 o'clock tank C is switched into recording position and considers the reverse operations from those described for tank B. The difference between the initial liquid heights is greater in tank C than in B, and a "pumping-out" operation will be recorded, as distinguished from the pumping-in operation noted for tank B. It will be evident that the column of liquid in conduit 64 will be maintained under these conditions without the assistance of support chamber 41. This emphasizes that such chamber is included only to retain the liquid column in conduit 64 where the pressure differential is one of negative relationship, not positive.

Based on the detailed description for tank B operation, it will be noted that the increase in height of the liquid level reverses the charting of the operation from the decrease procedure. As there is an immediate transfer of pressure rather than the gradual change experienced in the pumping-in operation, the fraction of an inch record hovers at the highest or 1%6 line until the upward movement is complete when cell 84 balances at 37′ 4⅝″, the assumed level of our problem. The response of the helically spaced pencil recorder element in the inch portion of the chart is the reverse from that previously described, being rotated to mark upwardly on the initial movement of cell 66. Thereafter the helically spaced pencils continue to rotate in the same direction marking, as it were, upwardly. This continues until the last 1 inch increment for cell 66 is reached when the pencil for the 4″ mark engages chart 238. Foot stylus 236 is stepped across the chart as explained above, but as the time interval is so short the rise from 33′ 6¼″ to 37′ 4⅝″ is shown, for this stylus, as a straight line. Having balanced at this depth, it is assumed that it remains inactive until 1:30, when a pumping out operation reduces the level from 37′ 4⅝″ to 36′ 9½″.

Referring again to the previously described "pumping-in" action charted between 12:30 and 1:00 for tank B, it will be noted that the stylus action in all three divisions of the chart is the reverse of that action. It will be noted, further, that the marks on the chart indicate the rapidity of the increase and decrease of the liquid level as it reflects these pumping actions. Thus a rate of pumping is recorded as well as the resulting liquid level.

In this operation of pumping out from tank C starting at 1:30, the foot marking stylus in response to the step-by-step movement of tape 72 as operated by the solenoid actuator 137, shows a series of stepped down marks. The inch marking resulting from the helically spaced pencils periodically engaging the chart is indicated in this space. As required in this coordinated recording operation, the zero or 12 inch pencil records as the foot stylus passes through the 37 foot mark and the next pencil stylus of the helix, the 11 inch marker, records from the top down to the 9 inch indication.

Interspersed with this operation of the foot and inch styluses, the fraction of an inch stylus 243 is moved forward and backward over the chart for every one inch of downward movement of pressure cell 66. As previously described for the pumping-in action of tank B, the pressure balance between cells 66 and 84 is gradually affected requiring cell 84 to run downwardly and upwardly between cell 66 contacts 136 and 134. Thus the motor operates stylus 243 in one direction when floating shaft 226 engages wheel 130, and reverses the movement in its reversed operation after cell 66 drops down and cell 66 comes to rest at the next lower position. Thus the chart indicates the hunting operation of stylus 243, initially downwardly from the last reading to substantially zero, then through the full 15/16 scale until the final reading of ½ inch is reached, indicating 36 feet 9 and ½ inches as the final depth in tank C at 2:00 o'clock.

Conclusion

The above description of a pressure operated liquid depth indicating and recording apparatus considers progressively complex mechanisms, all based on the same principles of operation. To the basic device, simply constructed to balance the hydraulic pressure of the adjustable indicator column against the hydraulic pressure of the stored liquid, elements for more exact measurement and automatic operation have been added. Measurement of the required counteracting hydraulic head indicating the stored liquid depth is made accurate to a high degree by employing several liquids of different specific gravities so related in the apparatus to act as enlarged measuring means, one for the other. Such a device, in varying forms for use solely with separate tanks, or one measuring means for a multiplicity of tanks, is disclosed.

What is claimed is:

1. In a pressure responsive liquid level measuring system, a float in contact with the liquid to be measured, a flexible tube mechanically connected at one end to the float and containing a liquid of high specific gravity, the pressure exerted by the liquid within said tube varying with changes in the level of the liquid to be measured, a first cell containing a high specific gravity liquid and connected to receive the pressure exerted by the liquid within said tube, said cell being vertically movable to initially balance said last-mentioned pressure, a second cell cooperatively movable with said first cell, a conduit connecting the upper part of the first cell to the lower part of the second cell, and a liquid of low specific gravity supported in the upper part of the first cell and above the high specific gravity liquid therein, said low specific gravity liquid rising into the second cell by way of said conduit to represent pressure differences in the first cell over a vertical distance proportional to the relative specific gravities of the two liquids therein.

2. In a pressure responsive liquid level measuring system for use with a stored body of liquid, a float in contact with said stored liquid body, a tube suspending a column of pressuring liquid from said float, a vertically adjustable first cell containing a first high specific gravity liquid and connected to receive pressure from said tube, a vertically adjustable second cell adjacent said first cell, a flexible conduit connecting the two cells in pressure transfer relation, and a second liquid of lower specific gravity than said first liquid and non-miscible therewith supported on top of said first liquid in the first cell, said second liquid rising into the second cell by way of said conduit, the relative specific gravities of said first and second liquids determining different vertical distances of movement for the separate cells to balance equal pressures.

3. A device for indicating the level of a body of liquid comprising a float, tubular means connected to the float supporting a column of pressuring liquid the vertical length of which is responsive to changes in the level of the liquid body; an initial cell conduit-connected to receive liquid pressure from the float-connector pressuring liquid column and vertically movable to balance said pressure; a second cell adjacent the initial cell, vertically movable therewith and conduit-connected to receive pressure from the initial cell; a liquid of different specific gravity supported by liquid in the initial cell extending into the second cell; and means to indicate the position of balanced pressure for said cells as a measure of the height of the level of the body of liquid.

4. A device for indicating the level of a body of liquid comprising a float, tubular means suspended by the float supporting a column of pressuring liquid the vertical length of which is responsive to changes in the level of the liquid body; an initial cell conduit-connected to receive liquid pressure from the float suspended pressuring liquid column and vertically movable to balance the liquid pressure; a diaphragm support means between the initial cell and float-suspended column of pressuring liquid maintaining a column of said liquid in cooperation with said initial cell; a second cell adjacent the initial cell, vertically movable therewith and conduit-connected to receive pressure from the initial cell; a liquid of different specific gravity supported by liquid in the initial cell extending into the second cell; and means to indicate the position of balanced pressure for said cells as a measure of the height of the level of the body of liquid.

5. In a pressure responsive liquid level measuring system for use with a stored body of liquid, a float-suspended tubular means containing one end of a column of contacting immiscible liquids of relatively high specific gravities the collective pressures of which are responsive to changes in the level of said stored body of liquid, two movable endless carrier tapes, cells carried by the respective carrier tapes, means coupling one of said cells to said column for receiving the liquids thereof, said one cell containing a relatively lighter liquid superposed on the column of heavier liquids; a conduit connecting the space in said one cell occupied by the lighter liquid with the other cell to thereby subject said other cell to the pressure of the lighter liquid, and a diaphragm in said other cell exposed on one face to the pressure of the lighter liquid and on its other face to atmospheric pressure, said other cell being vertically movable by its carrier tape into a position to balance the liquid pressure on said diaphragm.

6. The combination specified in claim 5 comprising an electric circuit closable by the diaphragm when subject to unbalanced pressure, and means operable by the electric circuit to indicate such unbalanced pressure, the last named cell being then movable until the electric circuit indicates a balanced pressure condition on the diaphragm.

7. The combination specified in claim 5 comprising also a pulley about which the tape carrying said other cell extends, a reversible motor in operative connection with said pulley, a switch operable by the diaphragm when the same is operated by unbalanced pressure, and an electric circuit controlled by said switch and controlling the operation of the reversible motor.

8. In a liquid level measuring system for use with a stored body of liquid, a float in contact with said stored liquid body, tubular means suspended by said float so that the upper end of a column of pressuring liquid of relatively high specific gravity is vertically positioned in said body of liquid, a first cell positioned to move vertically externally of the liquid body and connected to receive the pressured liquid from said float-suspended tubular means, a second vertically movable cell adjacent said first cell, a diaphragm dividing said second cell into upper and lower sections, a flexible conduit connecting the upper portion of said first cell with the lower section of said second cell, a liquid of lower specific gravity non-miscible with the heavier liquid filling said conduit and the associated spaces in said cells, thus requiring a greater vertical movement of the second cell, proportional to the specific gravities of the respective liquids, for balancing the pressure not balanced by the movement of the first cell, and signal means operable by the diaphragm of the second cell for indicating the balanced pressure condition.

9. A device for indicating the height of a tubularly supported column of pressuring liquid comprising, in combination with said tubularly supported column of liquid, a first cell operably connected to receive the pressured liquid of said column, vertically movable means suspending said first cell in operable relation to the height assumed by the liquid therein, a second cell suspended by vertically adjustable means adjacent said first cell, a flexible diaphragm dividing the second cell into upper and lower chambers, a flexible conduit connecting the space in the first cell above the liquid therein and the lower chamber of the second cell, a second liquid of lower specific gravity than and non-miscible with the pressuring liquid in said conduit in pressure exchange relation between said cells, signal means in cooperating engagement with said flexible diaphragm for indicating the position thereof, and measuring means cooperating with the vertical suspension means of the respective cells for indicating height of the pressuring liquid column as a function of the heights of the cells.

10. A system for selectively measuring the depth of liquid stored in a plurality of tanks comprising, in combination with said tanks, float means responsive to variations in liquid level in each of said tanks, a conduit-enclosed column of pressuring liquid suspended by each of said float means, a pressure chamber connected to receive the pressure of said pressuring liquid from a selected tank, controllable means for selectively connecting said pressure chamber to a particular one of said pressuring liquid columns corresponding to a preselected tank, a first pressure cell adapted for vertical movement and positioned adjacent said pressure chamber, a first flexible conduit connecting said first cell and said pressure chamber in pressure exchange relation, diaphragm support means between said flexible conduit and said pressure chamber for maintaining said conduit full of pressuring liquid under all operating conditions, a second cell vertically movable relative to said first cell and connected thereto by a second flexible conduit, a liquid filling the upper portion of said first cell and the lower portion of said second cell, said last-mentioned liquid being of lower specific gravity than the float-suspended column of pressuring liquid, and measuring means cooperating with both of said cells to measure the respective vertical movements thereof.

11. The system defined in claim 10 further characterized by said diaphragm support means between the flexible conduit and the pressure chamber including a support chamber, a diaphragm dividing said support chamber into upper and lower sections, a grid supporting said diaphragm, and conduit connections in said support chamber above and below said diaphragm.

12. A system for selectively measuring the depth of liquid stored in a plurality of tanks comprising, in combination with said tanks, separate float means responsive to liquid elevation variations in each of said tanks, a tube supported column of pressuring liquid open to the atmosphere and suspended by each of said separate float means, a common pressure chamber positioned to receive pressures from each of said columns, valve means selectively controlling the pressures delivered by each of said tanks to said chamber, a vertically movable first pressure cell adjacent said chamber and connected thereto by a flexible conduit to receive the pressuring liquid, a second cell vertically movable in conjunction with said first cell and connected thereto by a flexible conduit, a diaphragm dividing the second cell into an upper portion open to the atmosphere and a sealed lower portion, a second liquid supported in the space above the pressuring liquid in the first cell and below the diaphragm in the second cell and in the connecting flexible conduit, electrical operating means in engagement with said diaphragm for positioning said cells in response to pressure changes of said liquids, and measuring means cooperating with said cells to measure the vertical movement thereof as indicating the height of the liquid stored in each of the separate tanks.

13. The system in claim 12 further characterized by the electrical operating means for positioning the cells including switch means responsive to the diaphragm movement, a reversible motor operated by said switch means to raise and lower said second cell, two electrical contacts on the first cell extended into position to engage a separate contact on the second cell, said two contacts spaced apart a distance in inches equal to the difference between the specific gravities of the two liquids transferring pressures to the two cells, and a solenoid actuator moving the first cell vertically a unit distance in response to the movement of said second cell through the distance between said two contacts.

14. The system in claim 13 further characterized by the solenoid actuator including a housing divided into an upper and lower chamber, an excitable core mounted above the upper chamber and having a plunger positioned centrally thereof, a first flexible diaphragm across the top of the upper chamber supporting the plunger in operating position, a centrally apertured partition separating the upper and lower chambers, a second flexible diaphragm covering the central aperture and suspending circuit contacts in said lower chamber responsive to said second diaphragm movement, and restricted vent means connecting the upper and lower chambers.

15. The system in claim 12 further characterized by the measuring means cooperating with said cells comprising separately operable suspending tapes similarly calibrated, a fixed reference marker scribed with the measuring base datum of each tank, an adjustable index adapted to be clamped at the datum of the tank being measured on said fixed reference marker, and a movable fractional scale attached to the adjustable index on which the distance of vertical movement for the second cell responding to the liquid of lighter specific gravity is subdivided for measurement of fractional movement of the heavier liquid.

16. The system in claim 12 further characterized by the measuring means cooperating with said cells including a suspending tape and a measuring tape for each cell, the measuring tapes being equally calibrated and all tapes marked with the datum of each separate tank, clamping means for the tapes of the separate cells permitting datum adjustment, a fixed index for the tapes of each cell at an established elevation relative to the datum marks on the tapes, and a reference marker of the unit distance moved by the lighter specific gravity operated cell fractionally divided for indicating the true level of the stored liquid.

17. The system in claim 12 further characterized by the measuring means cooperating with said cells including a revolvable shaft adapted to respond to the vertical movement of the cells, means to engage said shaft with each respective cell only when that cell is moving, marking means engaging the shaft and responsive to the vertical movement of said cells, and a moving chart positioned to receive the operating indications of said marking means.

18. A recording device for a pressure operated liquid level indicator for stored liquid having a vertically adjustable primary cell initially counteracting the pressure in a float supported, tube enclosed column of liquid of relatively high specific gravity suspended in the stored liquid and a vertically adjustable secondary cell cooperating with the primary cell to balance the remaining pressure difference with an added column of relatively low specific gravity liquid, comprising spaced apart rotatable members separately responsive to the vertical movement of the primary and secondary cells respectively, a first shaft fixed to the rotatable member of the primary cell, marking means in operating engagement with said shaft, a second shaft engaging said first shaft and longitudinally slidable to engage the rotatable member responsive to the movement of the secondary cell, stylus means cooperating with said second shaft, chart means positioned to engage the marking and stylus means collectively, and means to longitudinally slide said second shaft into engagement with the secondary cell rotatable member only when said secondary cell is moving toward pressure balance.

19. A recorder for use with a liquid level indicator of a pressure type having primary and secondary measuring stages comprising spaced apart rotary members individually responsive to each of the separate measuring stages; a sleeve fixed to rotate in response to the primary measuring stage, said sleeve externally threaded over a portion thereof; and mounting a longitudinally movable stylus in threaded engagement therewith, the remaining portion of the external sleeve positioning a plurality of styli in helical position, each stylus marking a predetermined subdivision of unit measurement; an externally splined shaft positioned for longitudinal movement through said sleeve into and out of operating engagement with the primary and secondary measuring stage rotary members; a second longitudinally movable stylus in operating engagement with said splined shaft; resilient means urging the splined shaft into engagement with said secondary rotary member; means to disengage said shaft from operating engagement with the secondary member in opposition to the effect of said resilient means; and a time-operated chart positioned to receive the marks of said styli.

20. A pressure responsive liquid level measuring system for use with a stored body of liquid, comprising a float suspending a tube-enclosed column of contacting immiscible liquids of different specific gravities varying in vertical height in response to liquid level changes in the stored body of liquid, two movable endless carrier tapes each having scale calibrations, separate cells carried by each of said two carrier tapes, conduit means transmitting the pressure of the tube-enclosed liquid column to the first of said cells, requiring its vertical adjustment in order to balance the pressure of the connected tube-enclosed liquid column, with accompanying travel of its carrier tape to an extent varying with the pressure of said liquid column; a connection between the cells by means of which a lighter weight liquid is transferred to the second cell by pressure of a heavier non-miscible liquid transmitted to the lighter weight liquid component in the first cell, requiring the vertical adjustment of the second cell to an extent varying with the pressure of the lighter weight liquid, the extent of its vertical adjustment to balance the received pressure on the lighter weight liquid in said second cell governing the amount of travel of the movable carrier tape by which said second cell is carried, the extent of adjustment of the second cell subject to the pressure of the lighter weight liquid being greater than the adjustment of the first cell subject to the pressure of the heavier liquid to a degree approximately corresponding to their differences in specific gravities, and a reference marker which in the movement of each carrier tape registers with the calibrations of such tape, whereby the two measurements indicate, one the approximate height of the liquid in the stored body and the other the fractional deviation from such approximate height indication.

References Cited in the file of this patent

UNITED STATES PATENTS

| | | |
|---|---|---|
| 357,374 | Darling | Feb. 8, 1887 |
| 723,040 | Schmitz | Mar. 17, 1903 |
| 874,517 | Lowry | Dec. 24, 1907 |
| 1,557,568 | Dilley | Oct. 20, 1925 |
| 1,699,812 | Sartakoff | Jan. 22, 1929 |
| 1,837,113 | Cheney | Dec. 15, 1931 |
| 1,839,933 | Smulski | Jan. 5, 1932 |
| 2,380,177 | Hicks | July 10, 1945 |
| 2,387,563 | Chapple | Oct. 23, 1945 |
| 2,518,484 | Matthews | Aug. 15, 1950 |
| 2,568,361 | Pettigrove | Sept. 18, 1951 |
| 2,674,128 | Beam | Apr. 6, 1954 |
| 2,702,477 | Leone | Feb. 22, 1955 |

FOREIGN PATENTS

| | | |
|---|---|---|
| 646,910 | Germany | June 23, 1937 |